US012570525B2

(12) United States Patent
Siriwardane

(10) Patent No.: US 12,570,525 B2
(45) Date of Patent: Mar. 10, 2026

(54) CATALYSTS FOR CONVERSION OF CO₂ OR STEAM TO CO OR SYNTHESIS GAS USING FUELS

(71) Applicant: United States Department of Energy, Washington, DC (US)

(72) Inventor: Ranjani Siriwardane, Morgantown, WV (US)

( * ) Notice: Subject to any disclaimer, the term of this patent is extended or adjusted under 35 U.S.C. 154(b) by 898 days.

(21) Appl. No.: 17/699,274

(22) Filed: Mar. 21, 2022

(65) Prior Publication Data

US 2022/0315423 A1     Oct. 6, 2022

Related U.S. Application Data

(60) Provisional application No. 63/168,835, filed on Mar. 31, 2021.

(51) Int. Cl.
*C01B 3/326*        (2026.01)
*C01B 3/58*         (2006.01)

(52) U.S. Cl.
CPC ............... *C01B 3/326* (2013.01); *C01B 3/58* (2013.01); *C01B 2203/0811* (2013.01); *C01B 2203/1076* (2013.01); *C01B 2203/1205* (2013.01)

(58) Field of Classification Search
CPC ... C01B 3/326; C01B 3/58; C01B 2203/0811; C01B 2203/1205
See application file for complete search history.

(56) References Cited

U.S. PATENT DOCUMENTS

| | | | |
|---|---|---|---|
| 10,065,857 B2 | 9/2018 | Meissner et al. | |
| 12,122,967 B1 * | 10/2024 | Siriwardane | ............... C10J 3/10 |
| 2021/0171846 A1 * | 6/2021 | Hu | ........................... B01J 21/18 |

FOREIGN PATENT DOCUMENTS

| | | | |
|---|---|---|---|
| AU | 2015203898 B2 * | 3/2017 | |
| WO | 2014016790 | 1/2014 | |

OTHER PUBLICATIONS

H. Ohmet et al., Mechanisms of CO2 Gasification of Carbon Catalyzed with Group VIII Metals. 1. Iron-Catalyzed CO2 Gasification, Energy & Fuels, 1996, 10, 980-987.
T. Suzuki et al., Alkali Metal Catalyzed CO2 Gasification of Carbon, Energy & Fuels, 1992, 6, 343-351.
K. Asami et al., Gasification of brown coal and char with carbon dioxide in the presence of finely dispersed iron catalysts, Fuel Processing Technology, 1996, 47, 139-151.

(Continued)

*Primary Examiner* — Anthony J Zimmer
*Assistant Examiner* — Jaanzeb C Raja
(74) *Attorney, Agent, or Firm* — Aaron Keith; Andrew Choi; Michael J. Dobbs

(57) ABSTRACT

A catalytic method for producing gaseous products from a fuel and a gaseous reagent having the steps of: providing a catalyst and the fuel to a reactor vessel such that the catalyst and the fuel are in fluid communication with each other within the reactor vessel, where the catalyst is a mixture of reduced metal oxides; and contacting the fuel and catalyst with the gaseous reagent within the reactor vessel at a reaction temperature to produce gaseous products, where the gaseous reagent contains at least CO₂ or H₂O, where the fuel comprises a carbonaceous source, and wherein the gaseous products are CO or syngas.

19 Claims, 23 Drawing Sheets

(56) References Cited

OTHER PUBLICATIONS

S. Tanaka et al., CO2 Gasification of Iron-Loaded Carbons: Activation of the Iron Catalyst with CO, Energy & Fuels, 1995, 9, 45-52.

K. Mondal et al., Dry reforming of methane to syngas: a potential alternative process for value added chemicals-a techno-economic perspective, Enivron. Sci. Pollut. Res. 2016, 23, 22267-22273.

L. Silva et al., Evaluation of nickel and copper catalysts in biogas reforming for hydrogen production in SOFC, Revista Materia, 2017, 22.

F. Zhang et al., Catalytic CO2 gasification of a Powder River Basin Coal, Fuel Processing Technology, 2015, 130, 107-116.

W.J. Jang et al., A review on dry reforming of methane in aspect of catalytic properties, Catalysis Today, 324, 2019, 15-26.

* cited by examiner

CO2 10% Steam 10%

CO2 10% Steam 22%

CATALYSTS FOR CONVERSION OF CO₂ OR STEAM TO CO OR SYNTHESIS GAS USING FUELS

CROSS-REFERENCE TO RELATED APPLICATIONS

This Utility patent application claims priority benefit as a U.S. Non-Provisional of U.S. Provisional Patent Application Ser. No. 63/168,835, filed on Mar. 31, 2021, the entirety of which is incorporated by reference herein.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments relate to producing CO or synthesis gas free of nitrogen using $CO_2$ and a carbonaceous fuel. More specifically, one or more embodiments relate to a novel catalytic process using reduced metal oxide catalyst, a carbonaceous fuel, and $CO_2$ to produce CO or syngas free of nitrogen. One or more embodiments relate to a novel catalytic process using reduced metal oxide catalyst, a carbonaceous fuel, and steam to produce syngas free of nitrogen.

BACKGROUND $CO_2$ via activation and re-introduction into chemical processes through a wide variety of approaches have been reported for $CO_2$ utilization to control greenhouse gas emissions. Conversion of $CO_2$ to CO or syngas is an attractive route, since both syngas and CO are highly versatile and widely used chemical precursors which can also be used for production of $H_2$. Electrochemical processes have also been reported for $CO_2$ conversion to CO, but these processes are energy intense. The thermal $CO_2$ conversion process described in this invention disclosure will have a significantly lower energy requirement.

$CO_2$ used for the method described in this invention disclosure can be taken from several different sources such as a coal combustion plant or water gas shift reactor, in which the $CO_2$ is produced at high temperatures. Using these high temperature $CO_2$ inputs for catalytic coal gasification or methane reforming not only produces valuable gases, but also lowers the $CO_2$ emissions.

Syngas production from carbonaceous fuels such as coal is commercially conducted via gasification process. The goal of the gasification processes is to obtain a concentrated syngas stream which is energy-laden and may be used for many applications. However, conventional coal gasification processes are generally capital intensive and require significant amounts of parasitic energy. Further, gasification processes normally involve partial coal combustion with either $O_2$ or air. When air is utilized, $N_2$ may enter the syngas, diluting the syngas and making the syngas extraction difficult. When $O_2$ is utilized, expensive oxygen production units tend to generate high parasitic losses. As a result, the development of alternative methods for syngas production from coal are a significant area of current interest.

For oxygen based commercial coal gasification, oxygen has to be separated from air which requires an air separation unit, using expensive cryogenic air separation, for instance. Steam is also required for the coal gasification process.

Gasification of carbonaceous fuels with $CO_2$ has many advantages compared to gasification processes over conventional coal gasification with coal/oxygen/steam. Gasification of coal with $CO_2$ does not require an air separation unit and provides a route to convert $CO_2$ to a useful product, thereby eliminating an amount of $CO_2$, and thereby limiting compression/storage costs. In addition, catalytic coal gasification processes can be carried out at temperatures below 900° C., while commercial gasification processes are generally conducted at temperatures exceeding 1000° C. There are also various advantages regarding the operation of the catalytic coal gasification process itself which include: reduction of caking and swelling, the absence of oil and tar products, and reduction in materials handling and mechanical problems due to moderate operating condition.

$CO_2$ gasification is reported to be a very slow process and catalysts are required for the process. In state of the art processes, coal is impregnated with catalytic solutions to improve reaction rates. The impregnation process, however, is not suitable for a commercial process because catalyst impregnation involves multiple steps as follows. Coal and catalytic solutions must be mixed prior to the introduction of the mixture to the gasification reactor to react with $CO_2$. The catalyst which is imbedded in the ash after the $CO_2$ gasification reaction must be separated from ash using wet chemical methods. Recovered catalyst must be used again to make catalytic solutions and impregnation of coal before the next coal injection to the reactor.

Alkali metal and iron based catalytic solutions have been used for coal impregnation. Reported reaction mechanism involves direct interaction of coal with iron or alkali facilitating the coal gasification reaction. Use of alkali has additional problems due to evaporation and corrosion.

A need exists in the art for a novel catalytic process using reduced metal oxide catalyst to generate CO or syngas from a carbonaceous fuel that overcomes the disadvantages of the prior art.

SUMMARY

Embodiments of the invention relate to materials and methods to generate CO or syngas through a reaction of a carbonaceous source with a gaseous reagent in the presence of a catalyst.

One embodiment of the method comprises a fully or partially reduced metal oxide as a catalyst for the reaction between coal and a gaseous reagent containing $CO_2$ to produce CO or syngas, wherein the catalyst comprises mixtures of oxides containing reduced forms of metals including $Cu^{+1}$, $Cu^0$, $Fe^0$, $Fe^{+2}$, $Mn^{+2}$, $Mn^{+3}$, and combinations thereof. In an embodiment, the catalyst comprises $Cu_x$—$Al_m$—$O_p$, $Fe_y$—$Al_m$—$O_p$, $Fe_y$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, where $5 \geq x > 0$, $5 \geq y > 0$, $5 \geq z > 0$, $5 \geq m > 0$, and $4 \geq p > 0$.

The invention provides a catalytic method for producing gaseous products from a fuel and a gaseous reagent comprising: providing a catalyst and the fuel to a reactor vessel such that the catalyst and the fuel are in fluid communication with each other within the reactor vessel, wherein the catalyst comprises a mixture of reduced metal oxides; and contacting the fuel and catalyst with the gaseous reagent within the reactor vessel at a reaction temperature to produce gaseous products, wherein the gaseous reagent comprises $CO_2$, wherein the fuel comprises a carbonaceous source, and wherein the gaseous products comprise CO.

The invention also provides a catalytic method for producing syngas products from a carbonaceous source and $CO_2$ comprising: providing the carbonaceous source and a catalyst to a reactor vessel, wherein the catalyst comprises a mixture of reduced metal oxides selected from the group consisting of $Cu_x$—$Al_m$—$O_p$, $Fe_y$—$Al_m$—$O_p$, $Fe_z$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, and combinations thereof, wherein 5≥x>0, 5≥y>0, 5≥z>0, 5≥m>0, and 4≥p>0; contacting the carbonaceous source and catalyst with a gaseous reagent to generate gaseous products.

The invention also provides a catalytic method for producing syngas products from a carbonaceous source and steam comprising: providing the carbonaceous source and a catalyst to a reactor vessel, wherein the catalyst comprises a mixture of reduced metal oxides selected from the group consisting of $Cu_x$—$Al_m$—$O_p$, $Fe_y$—$Al_m$—$O_p$, $Fe_z$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, and combinations thereof, wherein 5≥x>0, 5≥y>0, 5≥z>0, 5≥m>0, and 4≥p>0; contacting the carbonaceous source and catalyst with a gaseous reagent to generate gaseous products.

BRIEF DESCRIPTION OF THE DRAWINGS

The invention together with the above and other objects and advantages will be best understood from the following detailed description of the preferred embodiment of the invention shown in the accompanying drawings, wherein:

FIG. 16B showing $H_2$, CO and $CO_2$ concentrations during introduction of steam to a reactor containing biomass and no catalyst at 850° C., in accordance with the features of the present invention.

DETAILED DESCRIPTION

The following detailed description should be read with reference to the drawings in which similar elements in different drawings are numbered the same. The drawings, which are not necessarily to scale, depict illustrative embodiments and are not intended to limit the scope of the invention.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of ionic inorganic materials, methods of their preparation, and methods for using such materials. One or more embodiments consistent with the present invention relate to converting $CO_2$ to CO or syngas using a fuel and a catalyst. More specifically, one or more embodiments relate to a catalytic process to produce a CO containing gas stream. Still more specifically, one or more embodiments relate to converting $CO_2$ to CO or syngas using fuel, utilizing a catalyst comprising $Cu_x$—$Al_m$—$O_p$, $Fe_y$—$Al_m$—$O_p$, $Fe_y$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, and combinations thereof, where $5 \geq x > 0$, $5 \geq y > 0$, $5 \geq z > 0$, $5 \geq m > 0$, and $4 \geq p > 0$ One or more embodiments consistent with the present invention relate to production of syngas using a fuel, steam, $CO_2$ and a catalyst.

Figure 1A:
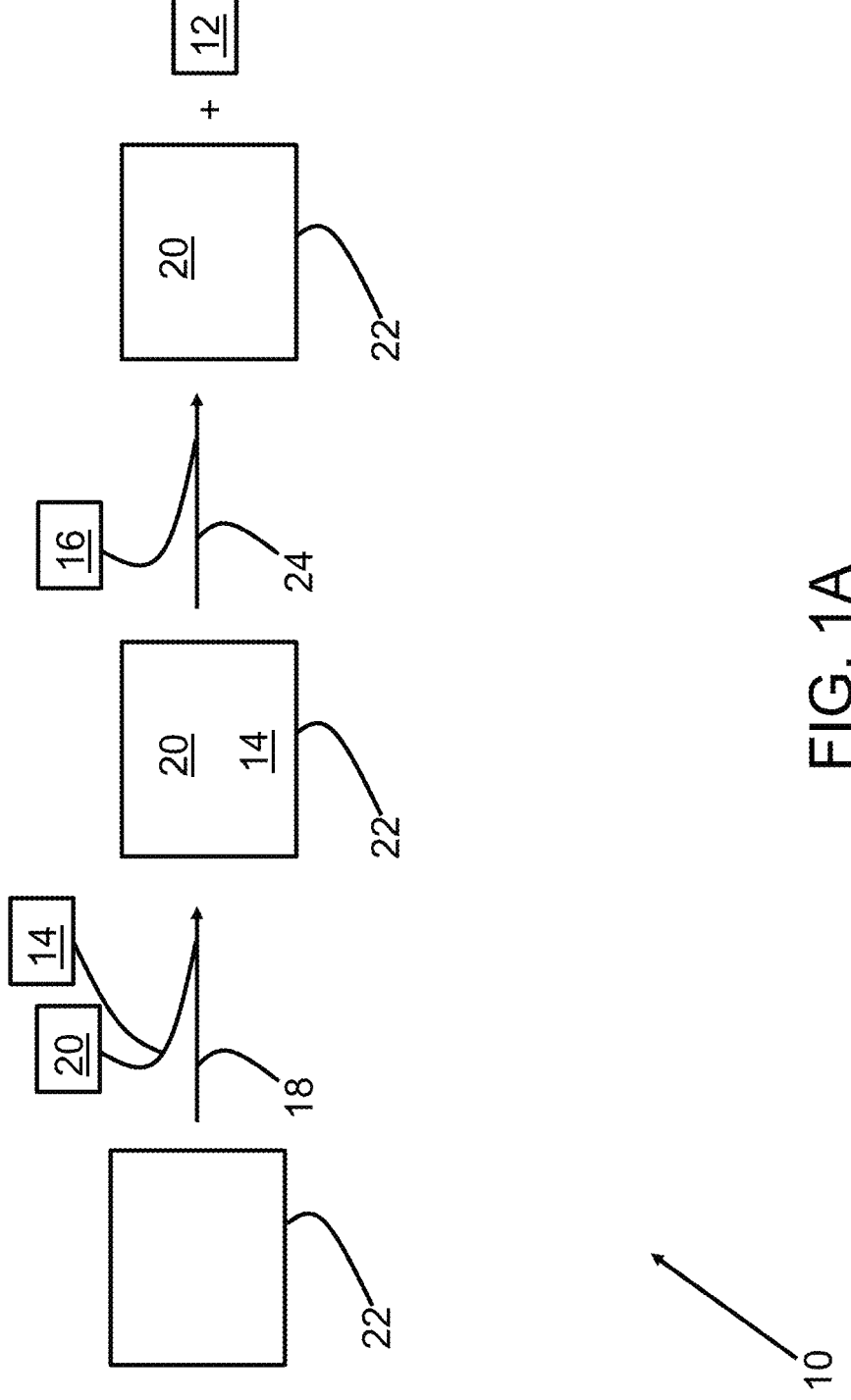
FIG. 1A is a schematic of a catalytic method for generating a gaseous product from a solid fuel and gaseous reagent, in accordance with the features of the present invention.

FIG. 1A is a simplified schematic showing a catalytic method 10 for producing gaseous products 12 from a fuel 14 and a gaseous reagent 16. As shown in FIG. 1A, the method 10 begins by providing 18 a catalyst 20 and the fuel 14 to a reactor vessel 22, wherein the catalyst 20 and fuel 14 are then disposed in the reactor vessel 22 such that they are in fluid communication.

The method continues by contacting 24 the fuel 14 and catalyst 20 with the gaseous reagent 16 within the reactor vessel 22. In said contacting step 24, the interior of the reaction vessel is heated to a reaction temperature and results in a reaction between the gaseous reagent 16 and fuel 14 to produce the gaseous products 12.

Figure 2A:
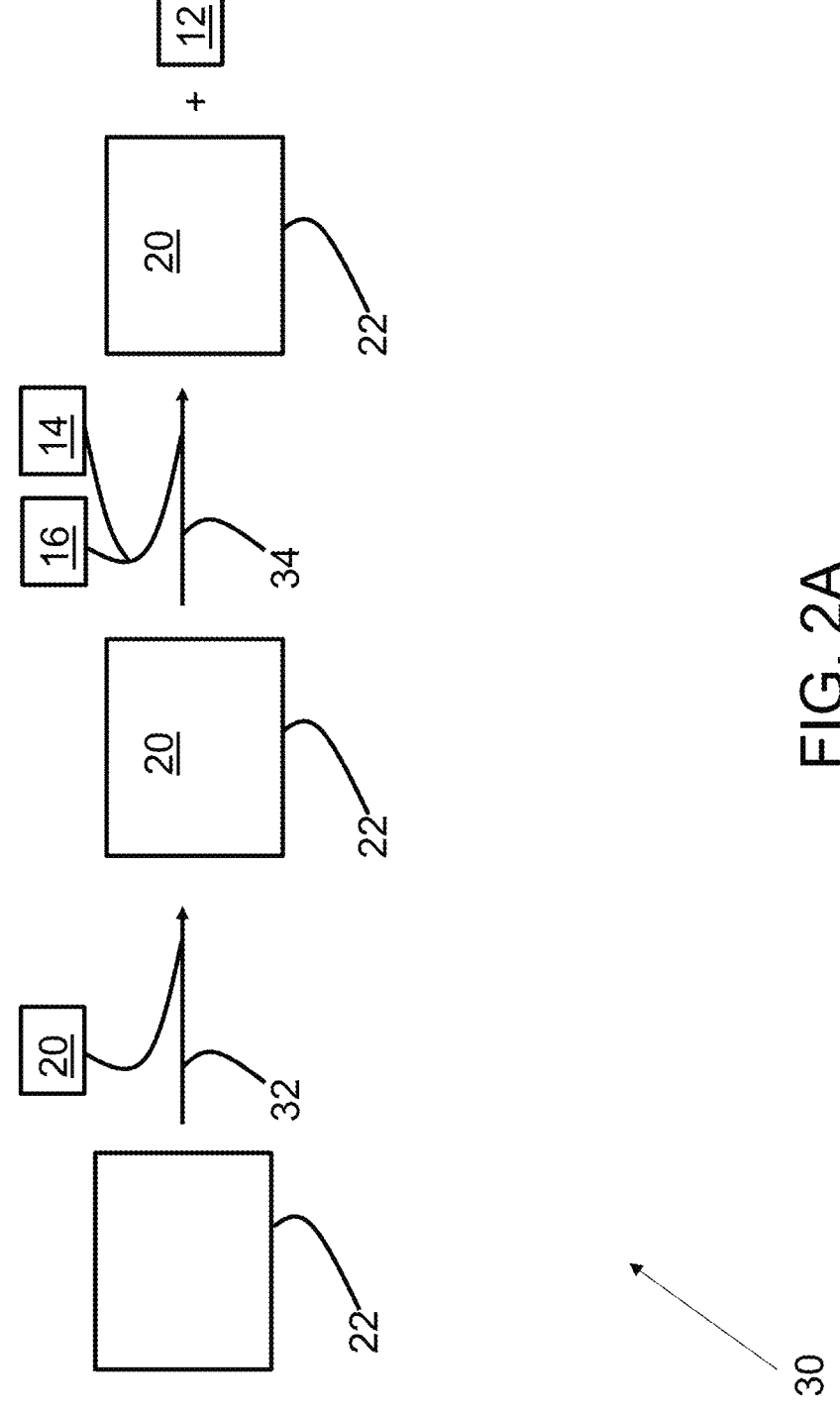
FIG. 2A is a schematic of a catalytic method for generating a gaseous product from a gaseous fuel and a gaseous reagent, in accordance with the features of the present invention.

FIG. 2A is a simplified schematic showing an alternative embodiment 30 of a catalytic method for producing gaseous products 12 from a fuel 14 and a gaseous reagent 16. This embodiment begins by providing 32 only the catalyst 20 to the reactor vessel 22. This embodiment continues by contacting 34 the fuel 14 and catalyst 20 with the gaseous reagent 16 within the reactor vessel 22. Said contacting step 34 occurs at a reaction temperature above 500° C. and results in a reaction between the gaseous reagent 16 and fuel 14 to produce the gaseous products 12. In this embodiment, the contacting step 34 comprises continuously introducing fuel 14 and gaseous reagent 16 into the reaction vessel 22 which continuously produces gaseous products 12.

As shown in FIGS. 1A and 2A and described above, the present invention involves the reaction between a fuel 14 with a gaseous reagent 16. In an embodiment, the fuel is any carbonaceous source suitable for reaction with $CO_2$ or other reagent to generate CO, syngas, and combinations thereof. Exemplary fuels include coal, biomass, biooil, coke, biochar, plastics, and combinations thereof.

The contacting steps 24, 34 of the described methods 10, 30 of FIGS. 1A and 2A use a gaseous reagent 16 to react with the fuel 14. In an embodiment, the gaseous reagent 16 is any gaseous moiety or combination of gaseous moieties suitable for reacting with a carbonaceous source described above to generate CO, syngas, and combinations thereof. Exemplary gaseous reagents include $CO_2$, steam ($H_2O$), and combinations thereof.

As shown in FIGS. 1A and 2A, the reaction occurring between the gaseous reagent 16 and the fuel 14 in the presence of the catalyst 20 occurring in the contacting step 24, 34 generates gaseous products 12. Exemplary gaseous products 12 include CO, syngas, and combinations thereof. A salient feature of the invention is that it produces gaseous products 12 and a stream thereof that does not contain nitrogen or any derivatives thereof.

Another salient feature of the invention is the use of the catalyst 20 to facilitate the reaction of the gaseous reagent 16 with the fuel 14. In an embodiment, the catalyst 20 comprises a fully or partially reduced metal oxide selected from the group consisting of iron oxide, manganese oxide, copper oxide, and combinations thereof. The fully or partially reduced metal oxide comprises a reduced form of a metal selected from the group consisting of $Cu^{+1}$, $Cu^0$, $Fe^0$, $Fe^{+2}$, $Mn^{+2}$, $Mn^{+3}$, and combinations thereof. In an embodiment, the reduced oxide catalyst comprises $Cu_x$—$Al_m$—$O_p$, $Fe_y$—$Al_m$—$O_p$, $Fe_y$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, where $5 \geq x > 0$, $5 \geq y > 0$, $5 \geq z > 0$, $5 \geq m > 0$, and $4 \geq p > 0$. The catalyst 20 comprises pellets, powders, nano particles, and combinations thereof. A person having ordinary skill in the art can readily ascertain the suitable physical form of catalyst 20 appropriate to their reactor setup.

In an embodiment, the catalyst 20 comprises active material (reduced oxide materials described above) disposed on an inert support. Suitable inert supports include alumino silicates, silica, titania, and combinations thereof. In such embodiments, the inert support comprises from about 5 wt. % to about 60 wt. % of the catalyst 20.

The catalyst 20 comprises fully or partially reduced metal oxides. For example, an embodiment of the invented catalyst 20 contains at least one of a reduced iron component, a reduced copper component, a reduced manganese component, and combinations thereof, where the reduced iron component comprises $Fe^0$, $Fe^{+2}$, and combinations thereof, the reduced copper component comprises $Cu^0$, $Cu^{+1}$, and combinations thereof, and the reduced manganese component comprises $Mn^{+3}$, $Mn^{+2}$, and combinations thereof. The CO produced by coal/$CO_2$/reduced metal oxide catalyst may be processed in a commercial water gas shift reactor to produce syngas or hydrogen.

The reactor vessel 22 comprises a fluidized bed, fixed bed, moving bed or spout bed.

Figure 9:
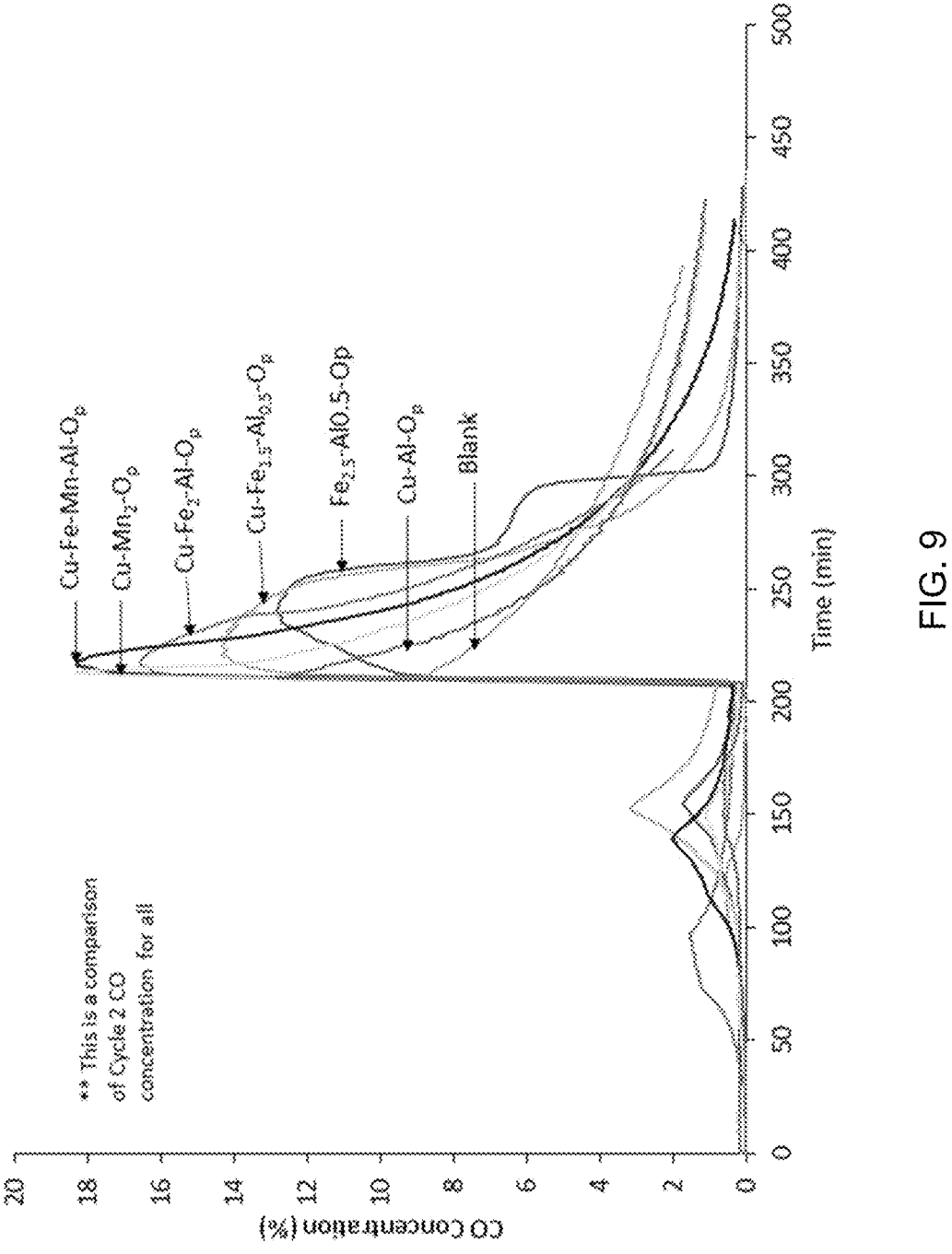
FIG. 9 is a plot comparing the CO concentration during the introduction of $CO_2$ introduction at 800° C. to a reactor containing lignite coal and varied embodiments of the invented catalyst, in accordance with the features of the present invention.
Figure 10:
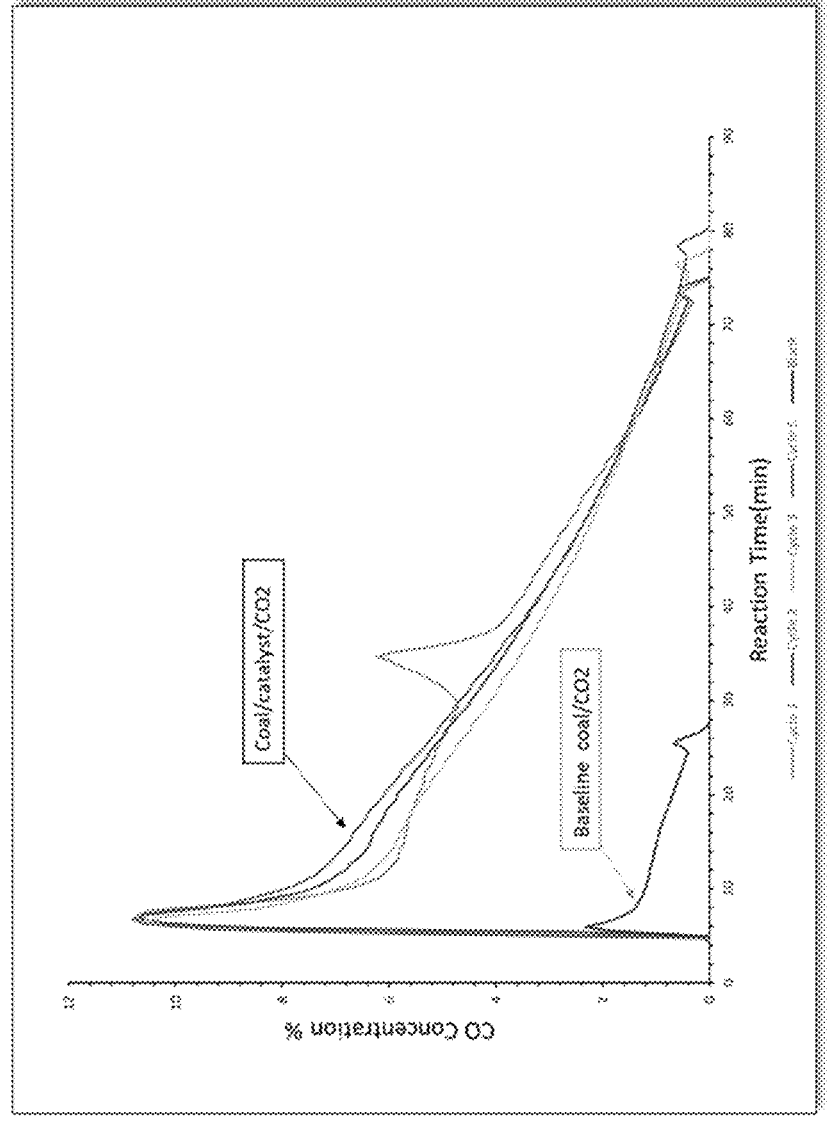
FIG. 10 is a plot depicting the CO concentration during $CO_2$ introduction to a fluidized bed reactor containing Cu—Fe—Al—$O_p$ catalyst and lignite coal at 800° C., in accordance with the features of the present invention.

In an embodiment, the invented method 10, 30 shown and described above uses $CO_2$ as the gaseous reagent 16, a solid carbonaceous source (coal, biomass, biochar, coke and combinations thereof) as the fuel 14, and any of the above-described catalysts as the catalyst 20, wherein $CO_2$ is provided in a stream comprising any amount of $CO_2$ up to 100% vol % $CO_2$. In this exemplary embodiment, the $CO_2$ reacts with solid fuel as shown in reaction 1 (R1), below, to generate CO. The generated CO is suitable for use in a water gas shift reactor to produce syngas or hydrogen. For R1, $\Delta H = +172$ J/mol at 25° C. and 1 atm. CO production rate in this process 10, 30 with catalyst/coal/$CO_2$ is higher than that with coal/$CO_2$ gasification without a catalyst. Empirical data has demonstrated that the instant invention provides rates of conversion % of $CO_2$ up to 75%. Further, as shown in FIG. 9, the $CO_2$ production rate with invented catalyst was about twice as that without the catalyst, with the data in FIG. 10 showing that the $CO_2$ production rate with catalyst was about 5 times that without the catalyst.

$$C + CO_2 \rightarrow 2CO \qquad \qquad R1$$

Embodiments of the invented method 10, 30 have been demonstrated both in a fixed bed reactor and in a fluidized bed reactor. In operation of the instant invention, the catalyst remains unchanged, and the process can be used continuously for CO production from coal and $CO_2$. One of the major advantages of the process is that it does not require an air separation unit for production of nitrogen free CO from coal. It utilizes a greenhouse gas $CO_2$ to produce useful chemical precursors from coal. The catalyst 20 does not have to be in direct contact with the coal 14.

In another embodiment, the method 10, 30 shown and described above uses a mixture of $CO_2$ and steam ($H_2O$) as the gaseous reagent 16, a solid carbonaceous source (coal, biomass, biochar, coke and combinations thereof) as the fuel 14, and any of the above-described catalysts as the catalyst 20, wherein the $CO_2$ and steam are provided in a stream that comprises steam and $CO_2$ in a ratio between approximately 3:1 steam to $CO_2$ by volume and 1:1 steam to $CO_2$ by volume. In this exemplary embodiment, the $CO_2$ and steam reacts with solid fuel as shown in reaction 2 (R2), below, to generate syngas. In this embodiment, the gaseous products comprise a product stream that is at least 25 vol % syngas.

$$2C + H_2O + CO_2 \rightarrow H_2 + 3CO \qquad\qquad R2$$

A salient feature of the invention is that the invented catalyst 20 facilitates the conversion of both $CO_2$ to CO and $H_2O$ to $H_2$. Such dual use catalysts are rare in the art.

In yet another embodiment, the method 10, 30 shown and described above uses only steam ($H_2O$) as the gaseous reagent 16, a solid carbonaceous source (coal, biomass, biochar, coke and combinations thereof) as the fuel 14, and any of the above-described catalysts as the catalyst 20. In this exemplary embodiment, the steam reacts with solid fuel as shown in reaction 3 (R3), below, to generate syngas. In this embodiment, the gaseous products comprise a product stream that is at least 25 vol % syngas. As used herein, "syngas" and "syngas products" both comprise a combined stream of CO and $H_2$.

$$C + H_2O \rightarrow H_2 + CO \qquad\qquad R3$$

A salient feature of the invention is that the fuel 14 and catalyst 20 are provided to the reactor vessel 22 as separate moieties that have not been previously chemically incorporated together, pelletized together, or the fuel impregnated with the catalyst. In typical and state of the art methods that react $CO_2$ or other gaseous reagents with coal or the other carbonaceous sources listed above, the coal or other fuel source is impregnated with the catalyst. In the instant invention, the catalyst 20 and fuel 14 are provided separately. For example, in embodiments using $CO_2$ as the gaseous reagent 16 and coal as the fuel 14, the coal is not chemically incorporated or pelletized together or impregnated with the catalyst, and said coal and catalyst are provided 18 to the reactor vessel 22 separately (as separate moieties). Surprisingly and unexpectedly, the invented method 10 allows for the generation of desired gaseous products 12, CO in the embodiment using $CO_2$ as the gaseous reagent 16 and coal as the fuel 14, wherein ash left over from reacting the gaseous reagent with the fuel does not contain catalyst. Typical and state of the art methods require chemical incorporation or pelletized together or impregnation of the fuel with the catalyst generate leave ash mixed with catalyst as an end product. In those methods, ash must be separated from catalyst material using wet chemical methods before the catalyst can be placed back into solution to impregnate more fuel. In an embodiment of the invented method, the catalyst is never chemically mixed or pelletized together or impregnated either with the fuel or ash generated from the reaction of fuel with the gaseous reagent, allowing for the catalyst to be reused without further processing.

Using the instant invention where the catalyst and fuel are not chemically incorporated or pelletized together, coal ash left over from the contacting steps 24, 34 is easily separated from the catalyst 20 using simple, physical separation processes based on differences between the ash and catalyst in density. For instance, increasing the flow rate of the gas inputs into the reactor vessel 22 will elutriate the ash from the reactor and can be collected in filters placed at the gas outlet location.

In an embodiment, the catalyst 20 is provided to the reactor vessel 22 in its finalized, reduced state.

Figure 1B:
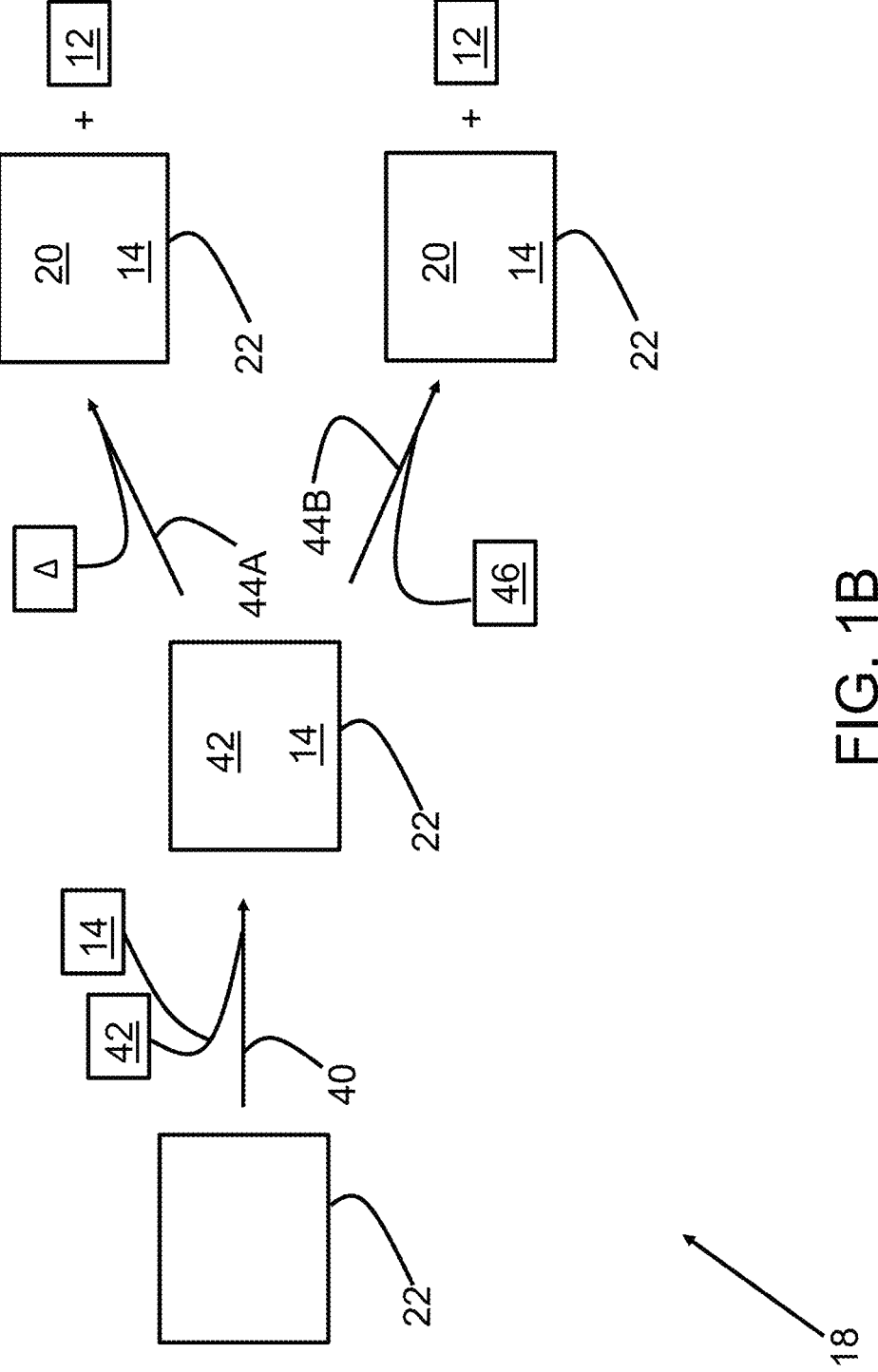
FIG. 1B is a schematic of a method for preparing the invented catalyst from a pre-catalyst used in the catalytic method shown in FIG. 1A, in accordance with the features of the present invention.

In an optional embodiment of the invention shown in FIG. 1B, the providing step 18 comprises providing 40 a pre-catalyst 42 and the fuel 14 to the reactor vessel 22. Similar to that as described above, the pre-catalyst 42 and fuel are provided to the reactor vessel 22 wherein the pre-catalyst 42 and fuel 14 are then disposed in the reactor vessel 22 such that they are in fluid communication. In embodiments using pre-catalyst 42, the providing step 18 further comprises reducing 44A, B the pre-catalyst 42 by contacting said pre-catalyst 42 with a reducing agent 46 at a reduction temperature.

This reducing step 44A, B reduces the metal moieties in the pre-catalyst 42 and generates the catalyst 20 shown in FIG. 1A and described above.

In an embodiment, the reducing step 44A comprises heating the reactor vessel 22 to a reduction temperature such that the fuel gasifies, contacts the pre-catalyst 42, reduces said pre-catalyst 42 and generates the catalyst 20 shown in FIG. 1A and described above. In this embodiment, the gaseous fuel 14 produced by heating the reactor vessel 22 is the reducing agent 46.

In another embodiment, the reducing step 44B comprises introducing said reducing agent into the reactor vessel 22 wherein the reactor vessel is heated to the reduction temperature. In this embodiment, the reducing agent is a separate moiety from the fuel and is purged from the reactor vessel 22 before the contacting step 24 of the method 10 proceeds.

In the embodiments of the providing step 18 shown in FIG. 1B, the pre-catalyst 42 is an oxidized or pre-reduction form of the catalyst 20 discussed above. The pre-catalyst 42 comprises at least one of an oxidized iron component, an oxidized copper component, an oxidized manganese component, and combinations thereof, where the oxidized iron component comprises $Fe^{+2}$, $Fe^{+3}$, and combinations thereof, the oxidized copper component comprises $Cu^{+1}$, $Cu^{+2}$ and combinations thereof, and the oxidized manganese component comprises $Mn^{+4}$, $Mn^{+3}$, $Mn^{+2}$, and combinations thereof. In an embodiment, the pre-catalyst 42 comprises $Cu_x$—$Al_m$—$O_q$, $Fe_y$—$Al_m$—$O_q$, $Fe_y$—$Mn_z$—$Al_m$—$O_q$, $Cu_x$—$Fe_y$—$Al_m$—$O_q$, $Cu_x$—$Mn_z$—$Al_m$—$O_q$, $Cu_x$—$Fe_y$—$Mn_z$—$Al_m$—$O_q$, where $5 \geq x > 0$, $5 \geq y > 0$, $5 \geq z > 0$, $5 \geq m > 0$, and $6 \geq q > 0$.

In embodiments using a pre-catalyst 42 that is reduced to form the catalyst 20, the pre-catalyst 42 may comprise a metal oxide or a combination thereof supported by an inert support. Suitable inert supports include alumino silicates, silica, titania, or combinations thereof. In such embodiments, the inert support comprises from about 5 wt. % to about 60 wt. % of the pre-catalyst catalyst 42. The pre-catalyst 42 comprises a mixture of at least one of iron oxide, copper oxide, and manganese oxide, and combinations thereof. In embodiment, the iron oxide component of the pre-catalyst 42 comprises $Fe^{+2}$, $Fe^{+3}$ in the forms of FeO, $Fe_2O_3$, $Fe_3O_4$, and combinations thereof, the copper oxide component comprises $Cu^{+1}$, $Cu^{+2}$, and combinations thereof in the forms of $Cu_2O$, CuO and combinations thereof, the manganese oxide component comprises $Mn^{+4}$, $Mn^{+3}$, $Mn^{+2}$, and combinations thereof in the forms MnO, $Mn_2O_3$ or $Mn_3O_4$.

In an embodiment, the inert supports interact with supported pre-catalyst materials during calcining as described in the preparation procedure below. For example, the inert supports may interact with the metal oxides in the pre-catalyst to form new phases. For example, a mixture of CuO, $Fe_2O_3$ and $Al_2O_3$ formed $CuFeAlO_4$ pre-catalyst after calcining and a mixture of CuO, $Fe_2O_3$, $Mn_2O_3$ and $Al_2O_3$ formed $CuFeMnAlO_4$ pre-catalyst after calcining. These pre-catalysts are reduced as described herein to form finalized catalysts 20.

The reducing agent 46 as shown in FIG. 1B and described above comprises a moiety suitable for completely or partially reducing the pre-catalyst 42 to produce the finalized catalyst 20. Exemplary reducing agents include $H_2$, syngas, $CH_4$, gasified carbonaceous source, or solid fuels/carbonaceous source such as coal, biomass, biochar, coke), and combinations thereof. When the reducing agent is $H_2$, syngas, gasified carbonaceous fuel, and combinations thereof, the reduction temperature is between about 500° C. to about 1000° C. When the reducing agent is solid fuel/carbonaceous source, the reduction temperature is between about 700° C. and about 1100° C.

Figure 2B:
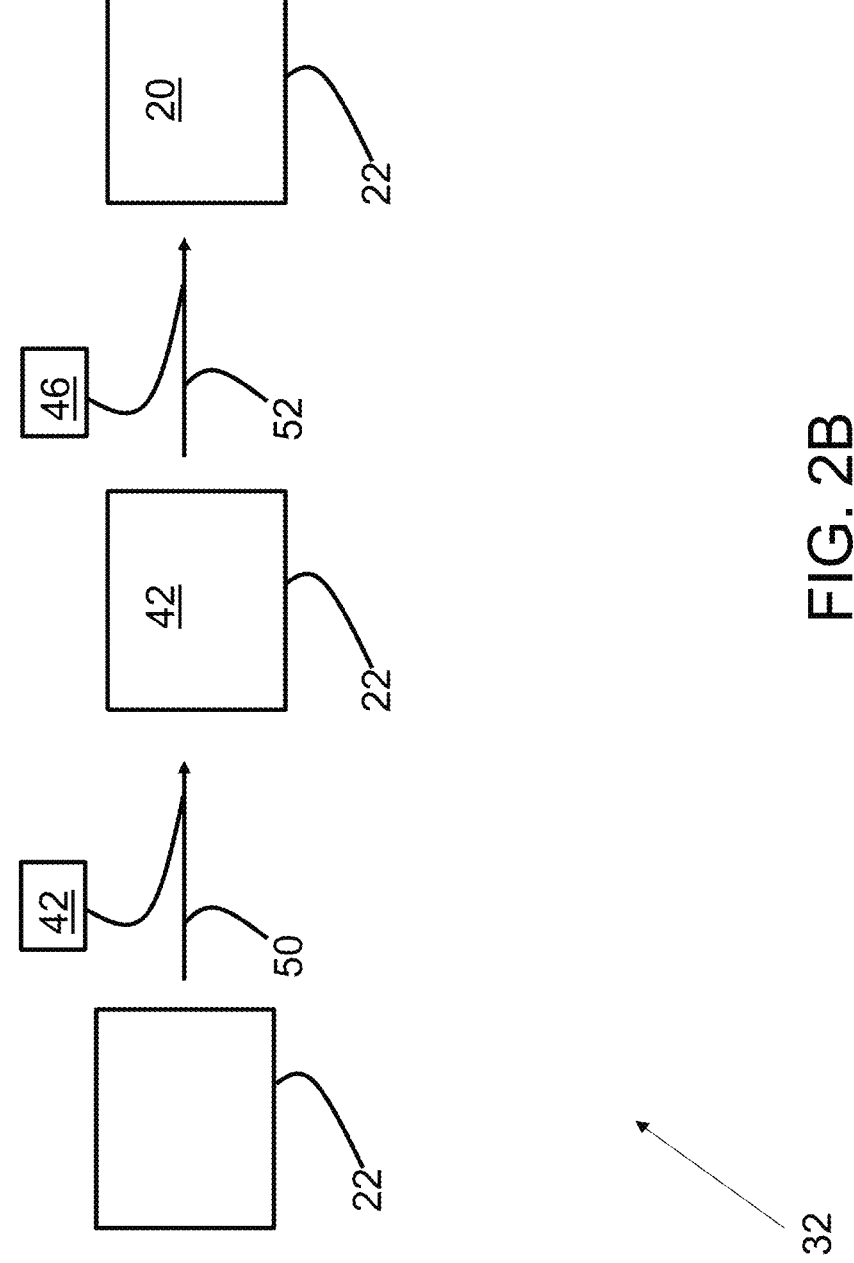
FIG. 2B is a schematic of a method for preparing the invented catalyst from a pre-catalyst used in the catalytic method shown in FIG. 2A, in accordance with the features of the present invention.

The embodiment of the invented method 30 shown in FIG. 2A can similarly utilize a pre-catalyst as shown in FIG. 2B. As shown in FIG. 2B, the providing step 32 comprises providing 50 a pre-catalyst 42 to the reactor vessel 22. In this embodiment, the pre-catalyst 42 is provided by itself to the reactor vessel 22. When using pre-catalyst 42 according to the embodiment of FIG. 2B, the providing step 32 further comprises reducing 52 the pre-catalyst 42 by contacting said pre-catalyst 42 with a reducing agent 46 wherein the reactor vessel has been heated to a reduction temperature. This reducing step 52 reduces the metal moieties in the pre-catalyst 42 and generates the catalyst 20 shown and described above. The embodiment shown in FIG. 2B uses the same pre-catalyst 42 as shown and described above and is suitable to use the same reducing agents 46 and reduction temperatures described above.

Performing the reducing steps 44, 52 "at a reduction temperature" comprises heating the interior of the reaction vessel and its contents to said reduction temperature prior to and/or during the reducing step.

In an embodiment, the invented method 10, 30 is used in conjunction with existing infrastructure. For example, the method 10, 30 can be easily combined with existing infrastructure at coal-combusting power plants to generate CO or syngas from coal during low heat demand times for the plants. In these embodiments, some portion of heat and $CO_2$ produced by burning coal or any other carbonaceous solid fuel in the power plant is provided to the reaction vessel 22 to drive the endothermic reaction between $CO_2$ and coal as facilitated by the catalyst 20. Thermal integration into an existing power plant has many advantages and enables flexible operation by shifting between heat-to-power and heat-to-chemicals using the $CO_2$ produced from fossil fuels as shown in the reactions R1-R5. When the catalytic coal $CO_2$ gasification reaction R1 and coal combustion reaction R4 are combined, the net reaction as shown in R5 produces heat (222 MJ per mole of $O_2$) and 2 moles of CO with no or minimal $CO_2$ emissions. Further, using $CO_2$ directly from the product stream of a coal-burning power plant eliminates the need to collect, compress, and store $CO_2$ while still providing CO. For R4, $\Delta H = -394$ MJ/Kmol at 25° C. and 1 atm. For R5, $\Delta H = -222$ MJ/Kmol of $O_2$ at 25° C. and 1 atm.

$$C + O_2 \rightarrow CO_2 \qquad \text{R4}$$

$$2C + O_2 \rightarrow 2CO_2 \qquad \text{R5}$$

In another embodiment, the instant method 10, 30 is used only to convert $CO_2$ from an existing coal-burning plant to produce to CO and not excess heat. In this embodiment, the heat required to drive the method 10 using $CO_2$ from the product stream of a coal-burning plant would be +172 J/mol of $CO_2$ which can be generated by reaction R6. This corresponds to generation of 0.44 moles of $CO_2$ as shown in reaction R6. In this embodiment, there is a net consumption of 0.56 moles of $CO_2$ from the combined catalytic $CO_2$ gasification reaction R1 and coal combustion reaction R6. Thus, in terms of $CO_2$ utilization, the invented method has many advantages over other current $CO_2$ utilization technologies.

$$0.44C + 0.44O_2 \rightarrow 0.44CO_2 \qquad \text{R6}$$

Using the embodiment of the invention 30 shown in FIG. 2A, the instant invention can also utilize a gaseous moiety or combinations thereof as the fuel 14. In an exemplary embodiment, the gaseous reagent 16 comprises $CO_2$, and the gaseous fuel 14 comprises $CH_4$. In this exemplary embodiment, the $CO_2$ reacts with $CH_4$ as assisted by the catalyst 20 to generate syngas as the gaseous products 12 as shown in reaction 7 (R7) below. For R4, $\Delta H = +247$ MJ/Kmol of $CO_2$ at 25° C. and 1 atm. In this exemplary embodiment, methane and $CO_2$ may be added continuously to the catalyst 20 in the contacting step 34 using reaction temperatures above 500° C. to produce syngas. In this embodiment, the gaseous product is a product stream that comprises more than 25% vol. % syngas.

$$CH_4 + CO_2 \rightarrow 2CO + 2H_2 \qquad \text{R7}$$

Still other embodiments relate to a method for producing syngas from $CO_2$ and $CH_4$ using the invented catalyst 20 combined with heat from fuel combustion. The catalytic conversion of $CO_2$/methane to syngas in reaction R7 can be combined with methane combustion reaction R8 to generate both syngas and heat as shown in reaction R9. The net products from the combined process are heat −278 MJ/Kmol of $CH_4$) and syngas with no $CO_2$ emissions. The process eliminates $CO_2$ separation, $CO_2$ compression, $CO_2$ storage but generates heat and a valuable chemical precursor syngas.

$$CH_4 + 2O_2 \rightarrow CO_2 + 2H_2O \qquad \text{R8}$$

$$2CH_4 + 2O_2 \rightarrow 2CO + 2H_2 + 2H_2O \qquad \text{R9}$$

In another embodiment methane is combusted as shown in reaction R10 to produce only sufficient heat (+248 MJ/Kmol $CH_4$) for the catalytic $CO_2$/methane reaction R7. The moles of $CO_2$ generated from reaction R10 is only 0.3. There is a net $CO_2$ utilization of about 0.7 $CO_2$ from the reactions R10 and R7.

$$0.3CH_4 + 0.6O_2 \rightarrow 0.3CO_2 + 0.3H_2O \qquad \text{R10}$$

All embodiments 10, 30 of the invented method react a fuel with a gaseous reagent in the presence of a catalyst at a reaction temperature.

Performing a step "at a reaction temperature" comprises heating the interior of the reactor vessel 22 and its contents to said reaction temperature prior to and/or during the accompanying reaction. For all the invented methods described herein, the reaction temperature is above 500° C., and preferably between about 650° C. and about 1000° C. The heat used to heat the interior of the reactor vessel and its contents to said reaction temperature can come from any suitable source of heat. Suitable sources include electrical sources, solar sources, microwaves, direct thermal sources, and combinations thereof.

Materials Detail

Catalysts 20 were prepared by mixing dry powder oxides according to the procedure found in Riley et al. Applied Energy 251 (2019) 113178 the entirety of which is incorporated by reference herein. CuO (98%, Aldrich), $Fe_2O_3$ (99%), $MnO_2$ (>95%. Alfa), and alumina (99%, Aldrich) powders were mixed to appropriate molar ratios to provide the desired formula, e.g., for $Cu-Fe_2-Al-O_q$ was prepared using ratios of 1 mole CuO:1 mole of $Fe_2O_3$:0.5 mole of $Al_2O_3$ and adding water in a rotating drum for wet agglomeration. Pellets formed in the agglomeration were dried and calcined above 1000° C. for 6 hrs. and screened to obtain particle sizes having a diameter of 180-600μ. Copper oxide, iron oxide, manganese oxide and alumina were used for the catalyst preparations. Combinations of metal oxides with appropriate molar ratios were used along with this procedure in order to obtain pre-catalysts 42 with molar compositions corresponding to $Cu-Fe-Mn-Al-O_q$, $Cu-Mn_2-O_q$, $Cu-Fe_2-Al-O_q$, $Cu-Fe_{1.5}Al-O_n$, $Fe_{2.5}Al_{0.5}-O_q$, and $Cu-Al-O_q$. The catalyst in the particle size range 75-300μ was prepared using spray drying technique for fluidized bed tests. After calcination at temperatures above 1000° C., the pre-catalyst 42 were reduced with 20% $H_2$ at 800° C. to form the final catalysts 20.

Coals (particle diameter 100-600 μm) used in the following tests and were Mississippi lignite coal and Wyodak coal (Sub bituminous coal). Wood chips (particle diameter 100-300μ) by Drax Biomass International, Inc. were used in some of the experiments.

Fixed Bed Flow Reactor Test Procedure

Bench-scale fixed-bed flow reactor tests were conducted using an Autoclave Engineers BTR atmospheric flow reactor (inner diameter 7 mm) at 14.7 psi ($1.01 \times 10^5$ Pa) with a Pfeiffer Vacuum Omnistar mass spectrometer used to test outlet gas compositions. Tests using a fixed bed flow reactor were conducted with approximately 9 g of reduced metal oxide catalyst 20 placed in fluid communication with approximately 2.4 g of coal 14. To begin, the mixture was heated up to 800° C. or 850° C. and 17-20% $CO_2$ was introduced at 800° C. or 850° C. Helium was used as the inert flow gas because the mass spectral peaks for $N_2$ overlap with those of CO. The total flow rate was 200 cm³/min (0.2 L/min.). 20% $CO_2$ was introduced continuously at 800° C. until the CO concentration was below 5000 ppm after the initial increase. After the concentration of CO dipped below 5000 ppm, gas flow to the reactor was stopped and the system allowed to cool. After cooling the reactor to ambient temperature, reacted coal was removed from the reactor, leaving the catalyst material in the reactor for additional cycles. After removal of the reacted coal, fresh coal (approximately 2.4 g) was added, and the reactor and the procedure repeated for a total of five cycles. A blank experiment was also conducted with coal and $CO_2$ without a catalyst. For experiments with biomass, 1 g wood chips were used as the fuel 14 and 7 g of catalyst 20 were used. In specified tests, $CO_2$ was introduced at 850° C.

Fluidized Bed Flow Reactor Test Procedure

Bench-scale fluid-bed flow reactor tests were conducted using an (inner diameter 5.5 cm) Autoclave Engineers reactor at 14.7 psi ($1.01 \times 10_5$ Pa) with a Pfeiffer Vacuum Omnistar mass spectrometer used to test outlet gas compositions. Unless otherwise specified, fluidized bed tests were conducted with approximately 200 g of catalyst 20 in fluid communication with approximately 50 g of coal 14 within the reactor. The reactor was then heated up to 800 or 850° C. when 20% $CO_2$ was introduced. Helium was used as the inert flow gas because the mass spectral peaks for $N_2$ overlap with those of CO. The total flow rate was 24 scfh. After the concentration of CO dipped below 5000 ppm, gas flow to the reactor was stopped and the system allowed to cool. After cooling the reactor to ambient temperature, reacted coal was removed from the reactor, leaving the catalyst material in the reactor for additional cycles (five total cycles). New coal (50 g) was added to the reactor in each addition. Blank experiments were also conducted with coal and $CO_2$ without a catalyst. Tests were also conducted with 200 g of catalyst and 100 g of coal. Tests with steam were conducted with 325 g of the catalyst and various amounts of coal. Fluidized Bed tests used coal particles having particle size of 200-600μ unless otherwise noted. This particle size ensures proper mixing with the catalyst and avoids elutriation during fluidized bed operation.

Fixed Bed Data on Conversion of $CO_2$ to CO with Mississippi Lignite Coal and $Cu-Fe-Al-O_p$ Catalyst.

Figure 3:
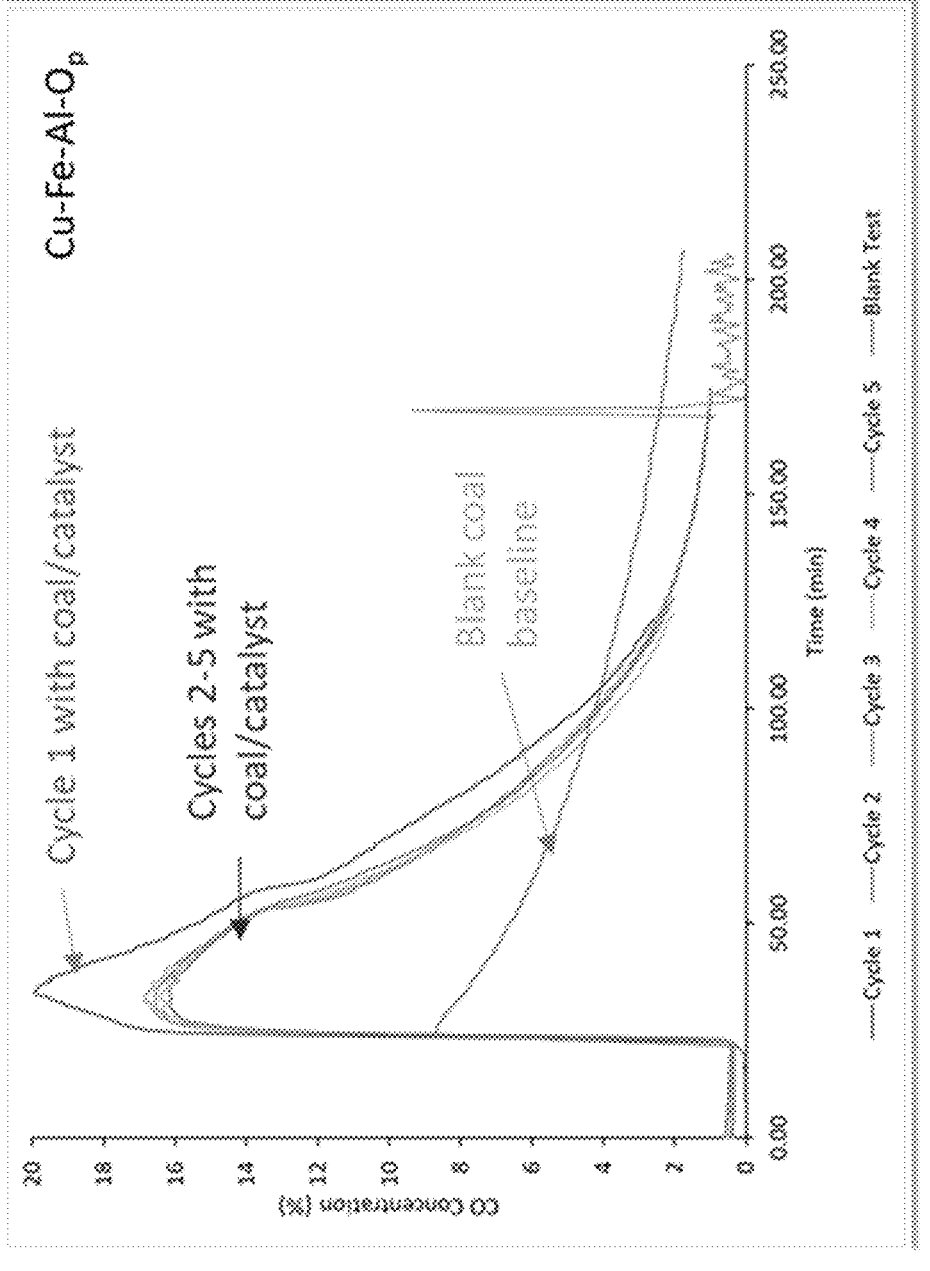
FIG. 3 is a plot depicting CO concentration during the introduction of $CO_2$ to a reactor containing Cu—Fe—Al—$O_p$ catalyst and lignite coal during multiple coal additions at 800° C., in accordance with the features of the present invention.

A test was performed according to the Fixed Bed Flow Reactor Test Procedure above using Mississippi lignite coal as the fuel 14 and a $Cu-Fe-Al-O_p$ embodiment of the invented catalyst 20. During the temperature ramp up to 800° C. of the reactor vessel containing the Mississippi lignite coal and catalyst 20 and before the introduction of reagent $CO_2$, the maximum concentrations of CO and $CO_2$ measured were less than 1.5% and 0.5% respectively, indicating minimal interaction of coal with the catalyst. When 20% $CO_2$ was introduced at 800° C. a significant amount of CO was formed as shown in FIG. 3. As shown in FIG. 3, the rate of CO formation with the catalyst 20 present was significantly higher (more than twice) than that with coal baseline without the catalyst. The data in FIG. 3 indicate that the catalyst has a significant effect on the production rate of CO from $CO_2$. This testing continued according to the procedure outlined above with four additions of fresh coal without removing or treating the catalyst in any way. As shown in FIG. 3, there was a slight decrease in reactivity after the first coal addition, but the CO concentration remained consistent during the 4 coal additions indicating that the catalyst was stable during the reactions.

Figure 4:
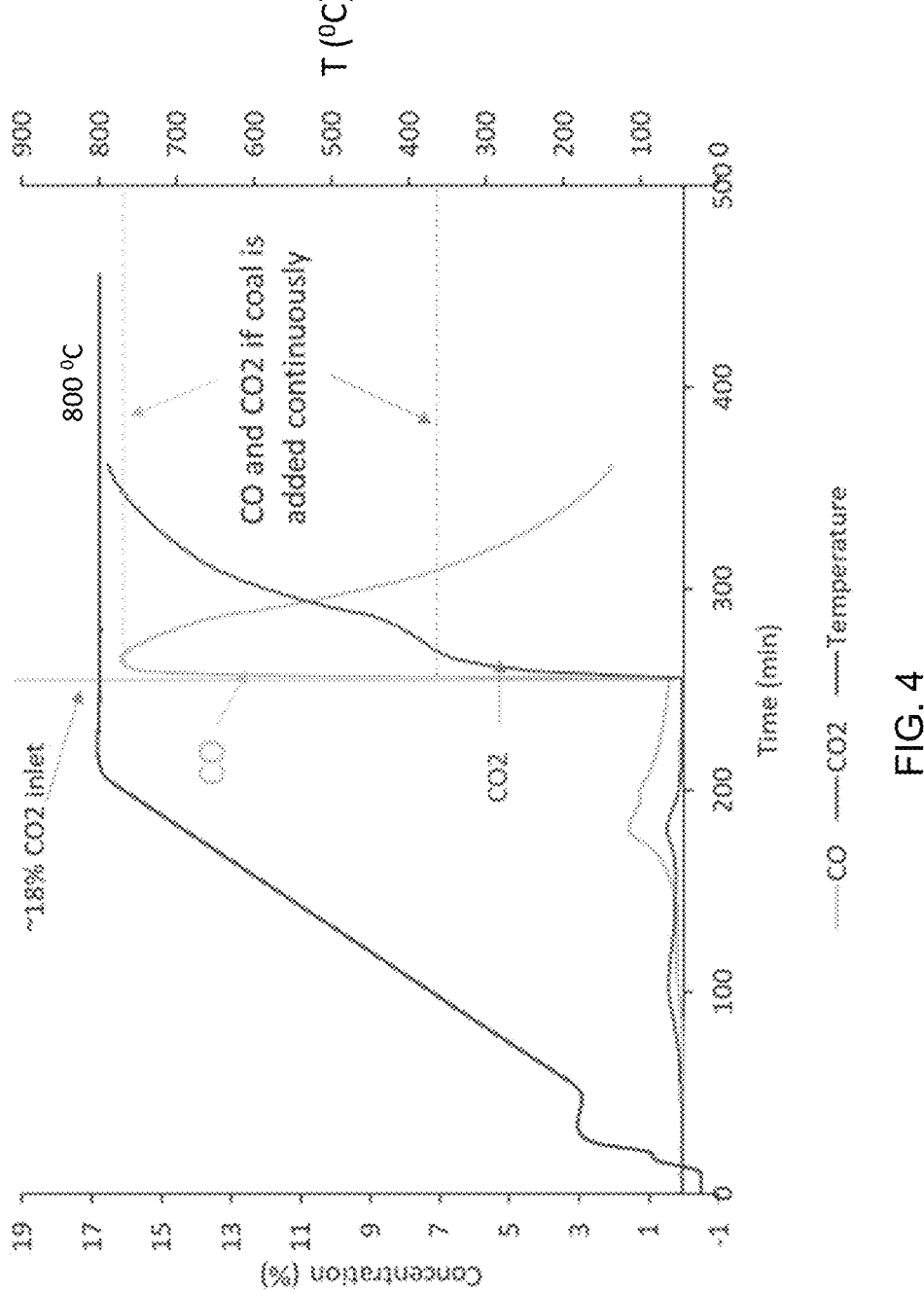
FIG. 4 is a plot depicting CO and $CO_2$ concentrations during the introduction of $CO_2$ to a reactor containing Cu—Fe—Al—$O_p$ catalyst and lignite coal at 800° C., in accordance with the features of the present invention.

The concentrations of CO and $CO_2$ for the fifth cycle of the Mississippi lignite coal and $Cu-Fe-Al-O_p$ catalyst are shown in FIG. 4. As shown in FIG. 4, The CO concentration increased rapidly when 18% $CO_2$ was introduced at 800° C. After reaching the maximum CO concentration, the CO concentration decreased because the amount of coal decreased due to reaction. In embodiments where coal is added continuously to the hot reactor the concentration of the CO will remain at the maximum level as shown in the dotted lines of FIG. 4. The $CO_2$ concentration corresponding to the maximum CO concentration was about 6.6% and the $CO_2$ conversion corresponded to about 63% with inlet $CO_2$ of 18%.

Figure 5:
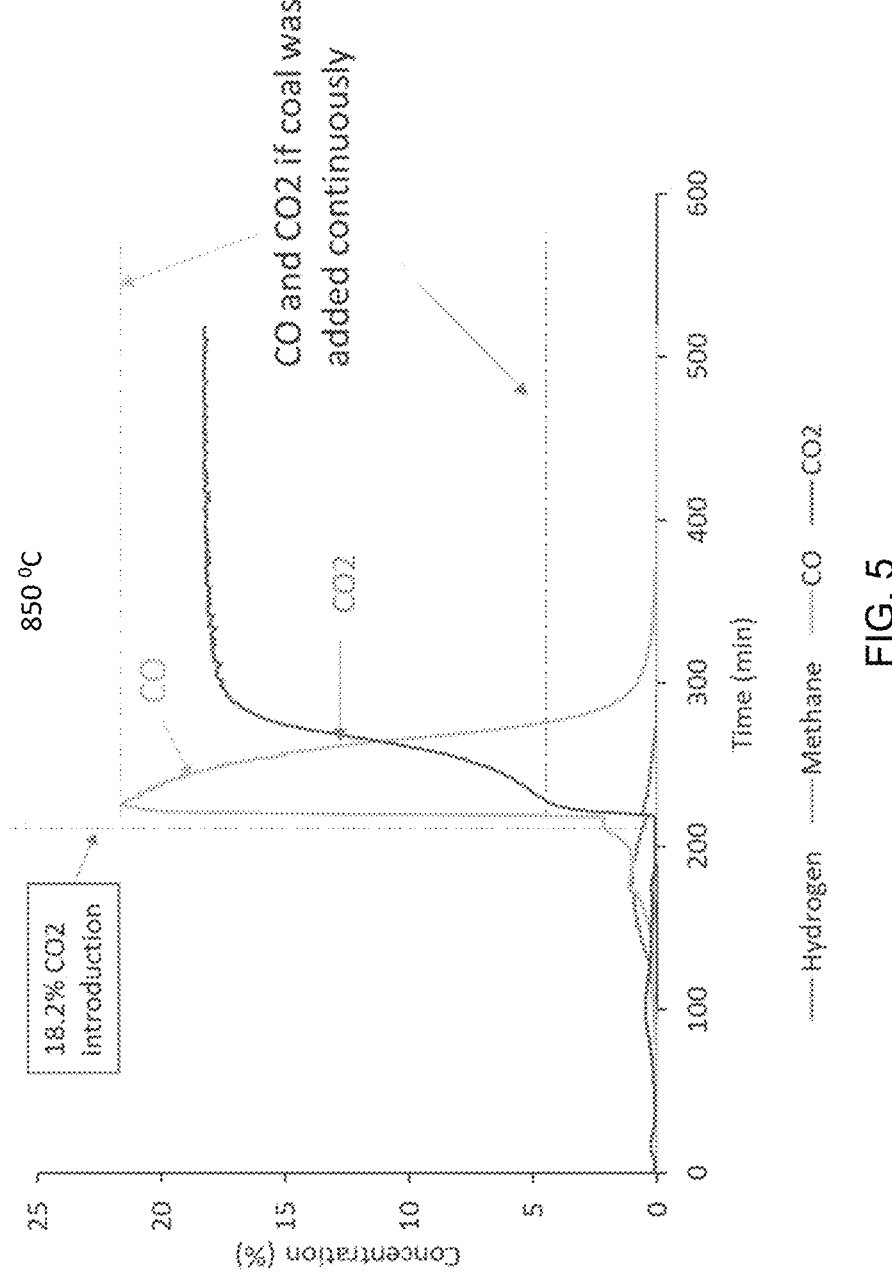
FIG. 5 is a plot depicting CO and $CO_2$ concentrations during the introduction of $CO_2$ to a reactor containing Cu—Fe—Al—$O_p$ catalyst and lignite coal at 850° C., in accordance with the features of the present invention.

In another test run according to the Fixed Bed Flow Reactor Test Procedure, $CO_2$ was introduced at 850° C. to a reactor containing Mississippi coal and $Cu-Fe-Al-O_p$ catalyst. After the temperature ramp, the concentrations of $CO_2$ and CO at the third coal addition cycle of that test are shown in FIG. 5. The rate of CO production increased rapidly when 18.2% $CO_2$ was introduced at 850° C. The production rate of CO at 850° C. was higher than that at 800° C. The $CO_2$ concentration corresponding to the CO maximum was about 4.6% and the $CO_2$ conversion corresponded to about 75%. The dotted lines in FIG. 5 indicate the CO and $CO_2$ concentrations if coal was added continuously to the hot reactor.

Figure 6:
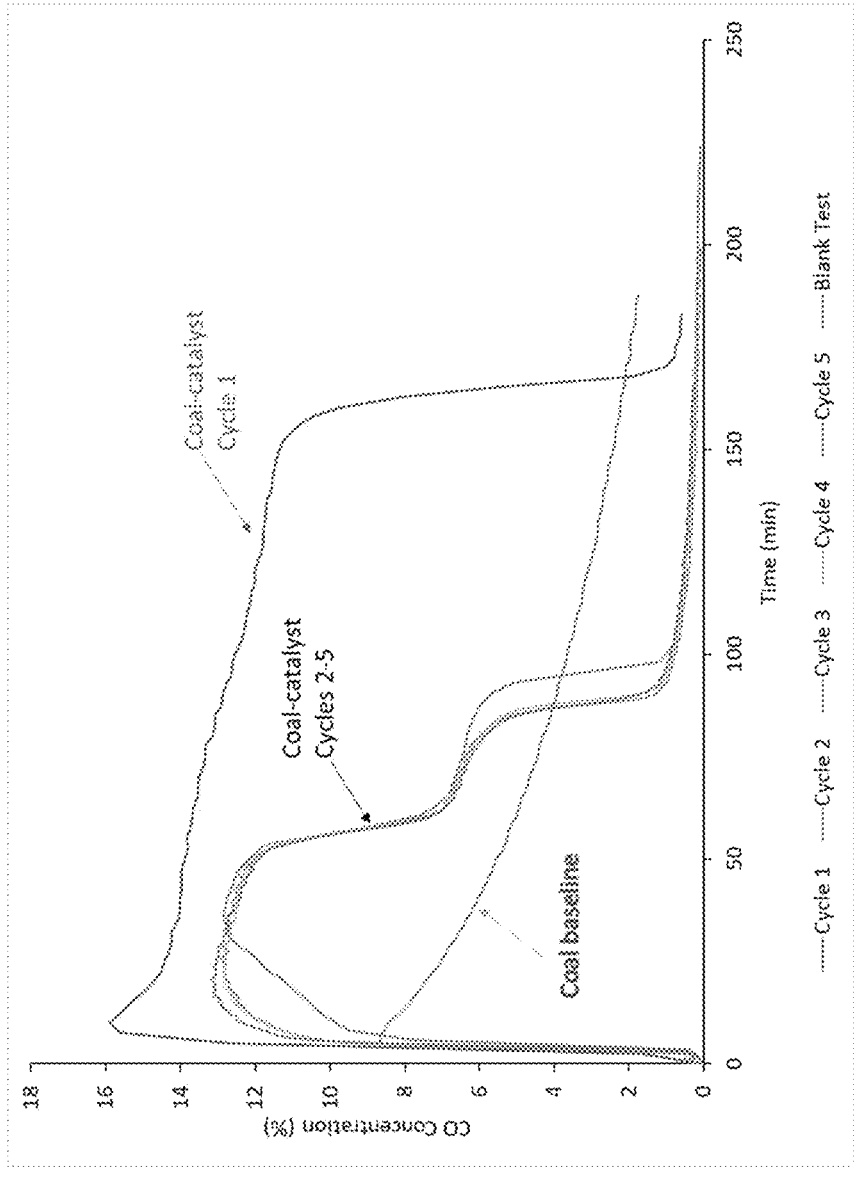
FIG. 6 is a plot depicting the CO concentration during $CO_2$ introduction to a reactor containing $Fe_{2.5}$—$Al_{0.5}$—$O_p$ catalyst and lignite coal at 800° C., in accordance with the features of the present invention.

Fixed Bed Data on Conversion of $CO_2$ to CO with Mississippi Lignite Coal and Fe-Alumina ($Fe_{2.5}$—$Al_{0.5}$—$O_p$) Catalyst A test was performed according to the Fixed Bed Flow Reactor Test Procedure above using Mississippi lignite coal as the fuel 14 and a $Fe_{2.5}$—$Al_{0.5}$—$O_p$ embodiment of the invented catalyst 20. When 18% $CO_2$ was introduced to the $Fe_{2.5}$—$Al_{0.5}$—$O_p$ catalyst 20 and coal 14 within the reactor at 800° C., a significant amount of CO was formed as shown in FIG. 6. As shown in FIG. 6, the rate of CO formation from $CO_2$ with coal in the presence of the $Fe_{2.5}$—$Al_{0.5}$—$O_p$ catalyst 20 was significantly higher than the rate of CO formation from $CO_2$ with coal without the catalyst (baseline test). The data shown in FIG. 6 indicate that the catalyst has a significant effect on the production rate of CO. The coal addition to the catalyst was continued for 5 total cycles. After each coal addition the reactor was cooled and the catalyst from the previous cycle was mixed with a new batch of coal. As shown in FIG. 6, there was some decrease in reactivity after the first cycle, but the CO concentration remained consistent during the next 4 cycles indicating that the reactivity of the catalyst was stable during the reactions. The concentration profile of CO with $Fe_{2.5}$—$Al_{0.5}$—$O_p$ (FIG. 6) is different from that with Cu—Fe—Al—$O_p$ catalyst (FIG. 3). As shown in FIG. 6, the $Fe_{2.5}$—$Al_{0.5}$—$O_p$ catalyst produced a CO concentration plot with two steps, indicating two distinct reactions. The CO concentration profiles observed in cycles 2-5 were consistent.

Figure 7:
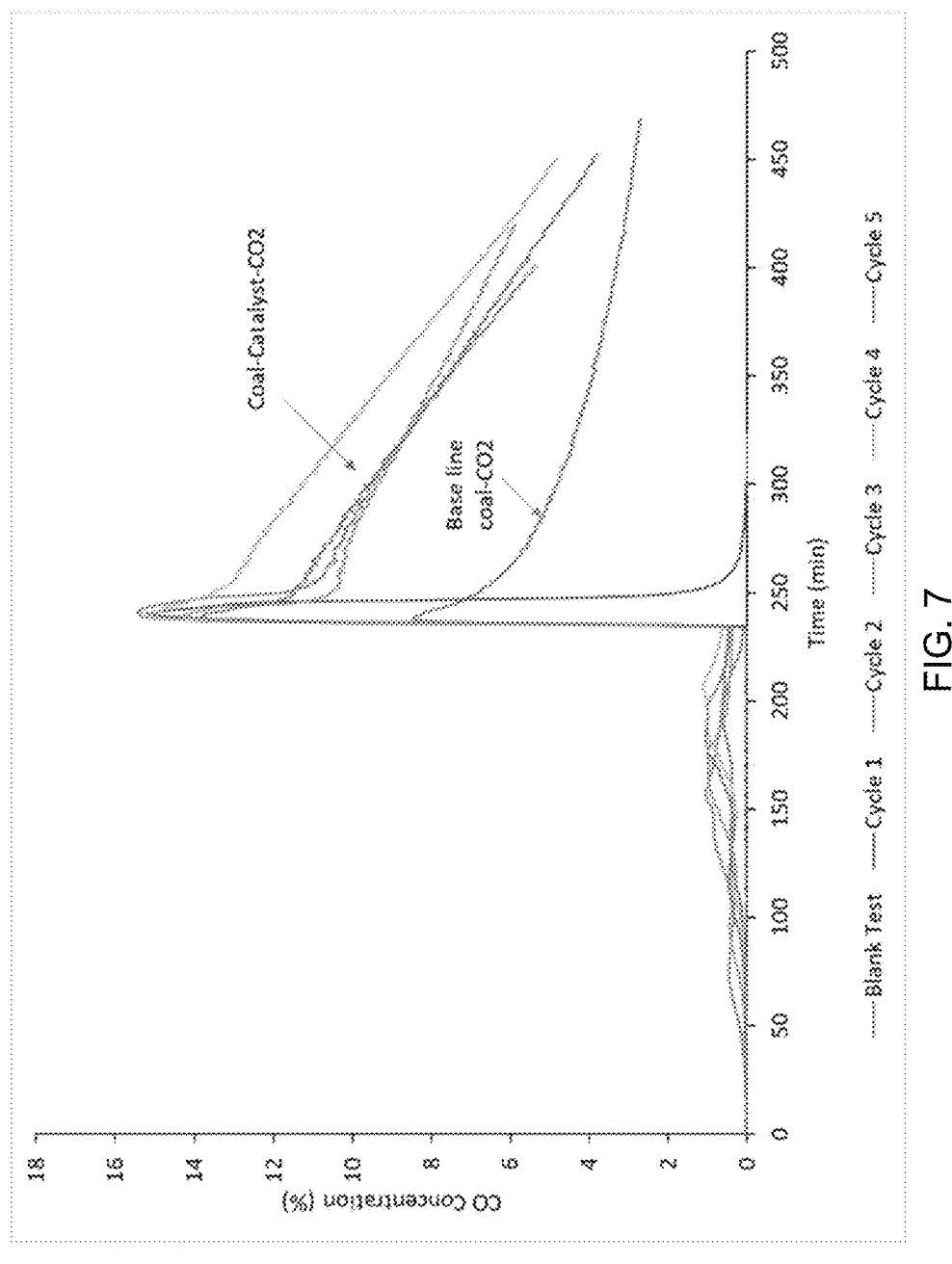
FIG. 7 is a plot depicting the CO concentration during $CO_2$ introduction to a reactor containing Cu—Fe—Al—$O_p$ catalyst and sub-bituminous coal at 800° C., in accordance with the features of the present invention.

Fixed Bed Data on Conversion of $CO_2$ to CO with Wyodak Sub-Bituminous Coal and Cu—Fe-Alumina (Cu—Fe—Al—$O_p$) Catalyst A test was performed according to the Fixed Bed Flow Reactor Test Procedure above using Wyodak sub bituminous coal as the fuel 14 and a Cu—Fe—Al—$O_p$ embodiment of the invented catalyst 20. When the temperature ramp was conducted with the mixture of Wyodak sub bituminous coal and catalyst in Helium, the concentrations of CO and $CO_2$ were less than 1.0%, indicating minimal interaction of coal with the catalyst as shown in FIG. 7. When 18% $CO_2$ was introduced at 800° C., a significant amount of CO was formed as shown in FIG. 7. The rate of CO formation from $CO_2$ reacting with coal in the presence of the catalyst was significantly higher (about twice as high) than that with coal baseline without the catalyst. The data in FIG. 7 indicate that the catalyst has a significant effect on the production rate of CO from $CO_2$ reacting with coal. The coal addition to the catalyst was continued for 5 total cycles. As shown in FIG. 7, the CO concentration remained stable during the five cycles of the test indicating that the catalyst reactivity was stable during the reactions.

Figure 8:
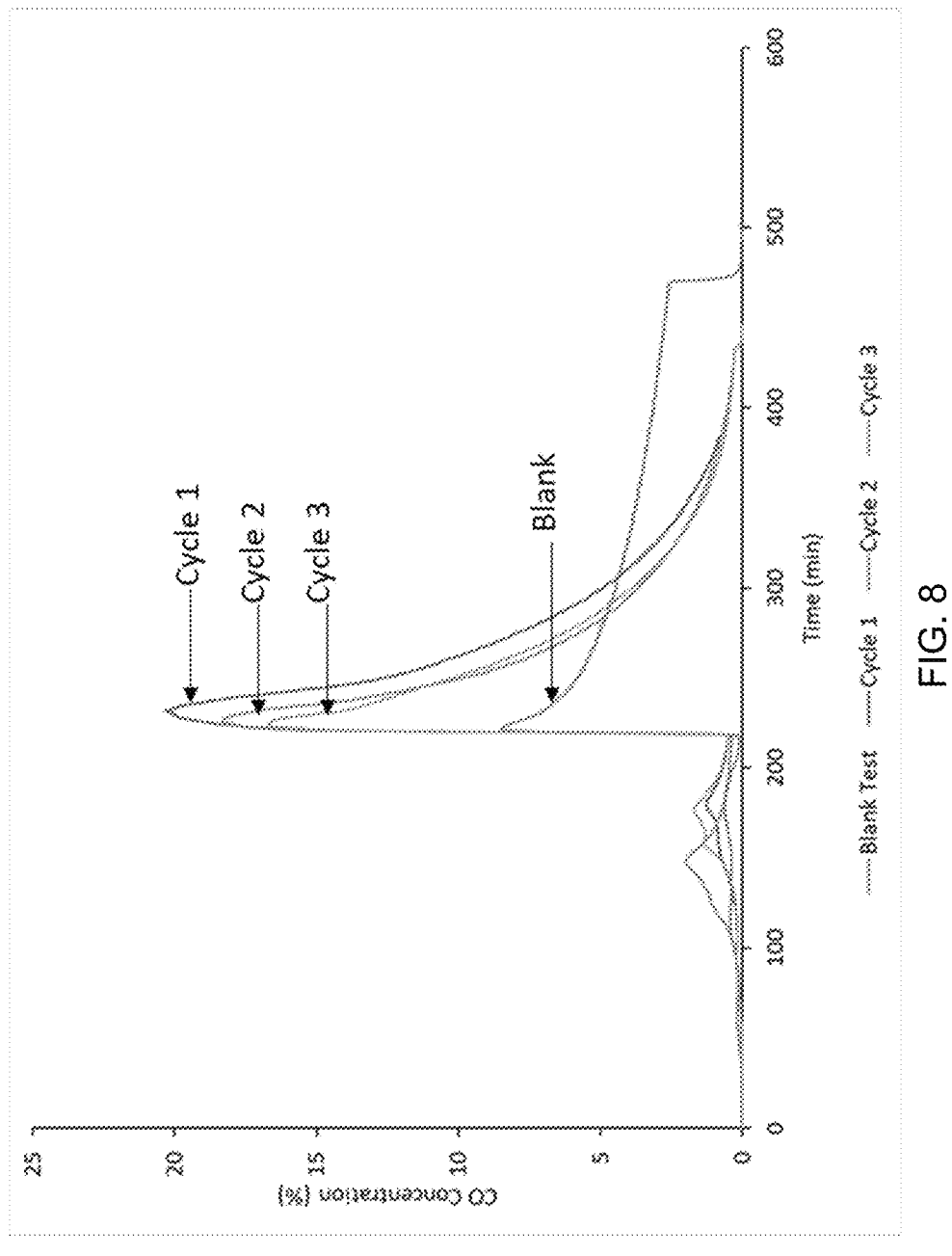
FIG. 8 is a plot depicting the CO concentration during $CO_2$ introduction to a reactor containing Cu—Fe—Mn—Al—$O_p$ catalyst and lignite coal at 800° C., in accordance with the features of the present invention.

Fixed Bed Data on Conversion of $CO_2$ to CO with Mississippi Lignite Coal and Cu—Fe—Mn-Alumina (Cu—Fe—Mn—Al—$O_p$) Catalyst A test was performed according to the Fixed Bed Flow Reactor Test Procedure above using Mississippi lignite coal as the fuel 14 and a Cu—Fe—Mn—Al—$O_p$ embodiment of the invented catalyst 20. The data from this test is shown in FIG. 8. As shown in FIG. 8, when 18% $CO_2$ was introduced to the Cu—Fe—Mn—Al—$O_p$ catalyst and coal within the reactor at 800° C., a high concentration of CO was observed with consistent CO formation during three cycles with coal.

FIG. 9 is a plot of the CO concentration % over time for the second cycle of each tested catalyst. Based on the CO concentration peak maximum, the reactivity order of the embodiments of the invented catalyst tested is: Cu—Fe—Mn—Al—$O_p$>Cu—$Mn_2$—$O_p$>Cu—$Fe_2$—Al—$O_p$>Cu—$Fe_{1.5}$—Al—$O_p$>$Fe_{2.5}$—$Al_{0.5}$—$O_p$>Cu—Al—$O_p$. Data shown in FIG. 9 for CO concentration % after introduction of $CO_2$ to a reactor containing coal and embodiments of the catalyst including Cu—$Mn_2$—$O_p$, Cu—$Fe_{1.55}$—Al—$O_p$, Cu—Al—$O_p$ were collected according to the Fixed Bed Flow Reactor Test Procedure outlined above, with the plot for each embodiment of the catalyst coming from the second cycle of the test with each catalyst.

From the data shown in FIG. 9, bi metallics and tri metallic components demonstrated better reactivity rates than single metallic catalysts. The data shows that there is synergistic effect due to the presence of transition metals, Cu, Fe, Mn, and combinations thereof. The oxidized/pre-reduction form of trimetallic and bimetallic aluminates (pre-catalysts 42) have spinel structures as observed using empirical Xray Diffraction Data. After reduction with $H_2$ to form the finalized catalysts 20 the spinel structure is destroyed. This is known to enhance micro cracks within the structure leading to enhanced diffusion of gases. Metal atoms are involved in the decomposition of $CO_2$ to CO and O forming intermediate adsorbed states. "0" atom then combines with carbon to form CO. Having multiple transition metals and resulting chemical changes appeared to enhance the decomposition of $CO_2$.

Fluidized Bed Test Data on Conversion of $CO_2$ to CO with Mississippi Lignite Coal and Cu—Fe-alumina catalyst (Cu—Fe—Al—$O_p$)

A test was performed according to the Fluidized Bed Flow Reactor Test Procedure above using Mississippi lignite coal as the fuel 14 and a Cu—Fe—Al—$O_p$ embodiment of the invented catalyst 20 having a particle size of 180-600μ. When 17.6% $CO_2$ was added to the Cu—Fe—Al—$O_p$ catalyst and coal within the reactor at 800° C. after the temperature ramp, a significant amount of CO was formed as shown in FIG. 10. As shown in FIG. 10, the rate of CO formation from $CO_2$ with the catalyst and coal was significantly higher than that with coal baseline without the catalyst. The data shown in FIG. 10 indicate that the catalyst has a significant effect on the production rate of CO. The coal addition to the catalyst was continued for 5 total cycles. After each coal addition the reactor was cooled and the catalyst from the previous cycle was mixed with a new batch of coal. The fluid bed reactor does not have a coal feeder to add coal to the heated reactor and reactor had to be cooled to add new coal. As shown in FIG. 10, the CO concentration remained consistent during the five coal additions, indicating that the reactivity of the catalyst was stable during the reactions. The ratio of moles of CO formed to moles of $CO_2$ utilized was 2 which is consistent with the reaction R1. The data indicate that the invented process can be performed in a commercial scale fluid bed reactor. This is a significant result in terms of operation because coal can be added continuously to the catalyst in the reactor bed where catalyst and coal are easily mixed in the reactor due to fluidization. The total amount of coal used during the five coal additions was 250 g with the 200 g catalyst.

Figure 11:
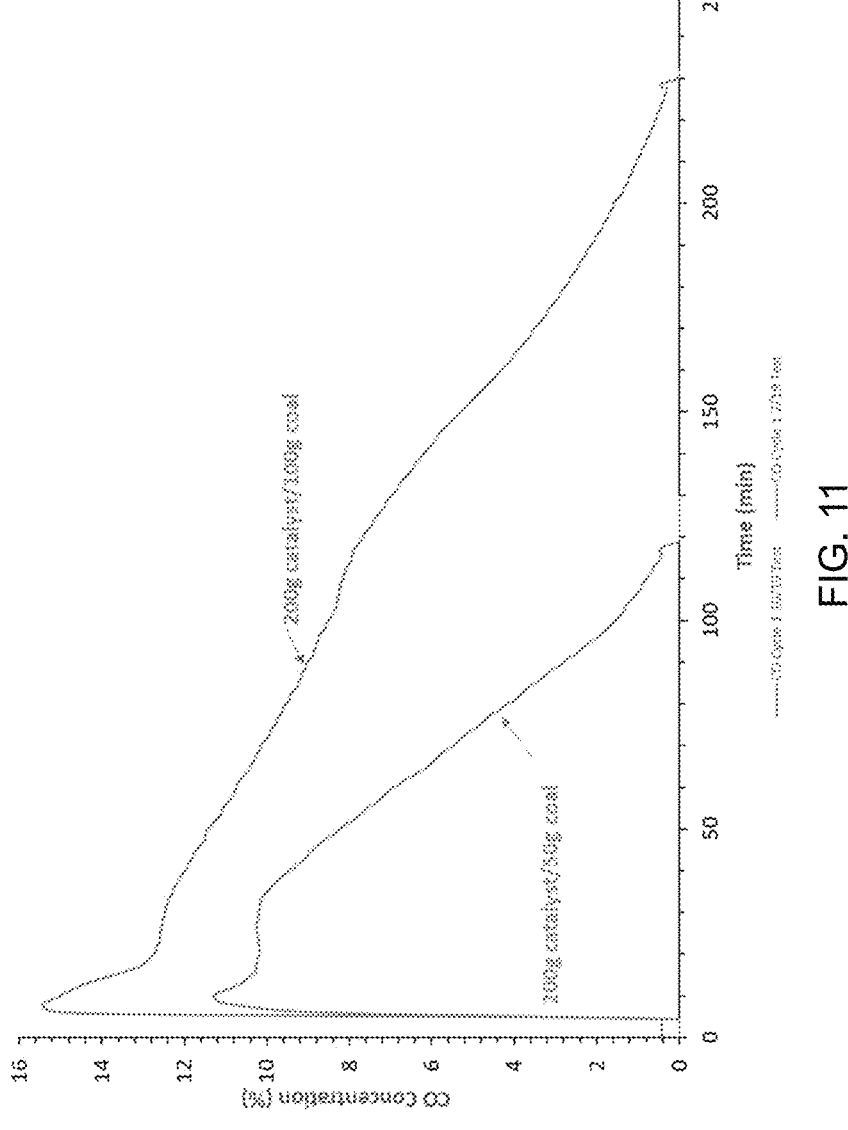
FIG. 11 is a plot depicting the CO concentration during $CO_2$ introduction to a reactor containing Cu—Fe—Al—$O_p$ catalyst and varying amount of lignite coal at 800° C., in accordance with the features of the present invention.

In order to evaluate the performance with increased amount of coal, a test was conducted with 100 g of Mississippi lignite coal and 200 g of Cu—Fe—Al—$O_p$ catalyst using the Fluidized Bed Flow Reactor Test Procedure outlined above. A comparison of CO concentrations when $CO_2$ was added at 800° C. to 100 g of coal/200 g catalyst and 50 g of coal/200 g of catalysts is shown in FIG. 11. Higher concentrations of CO with longer reaction time were observed when 100 g of coal was used. The data shown in FIG. 11 indicate that the reaction is feasible even with a larger quantity of coal. If the reactor had a coal feeder similar to a commercial reactor, coal could be added continuously to the heated reactor. The catalyst can facilitate the reaction with coal additions of 50 g or 100 g increments at a time.

Fluidized Bed Test Data with Coal and Steam/$CO_2$ Mixtures

Figure 12A:
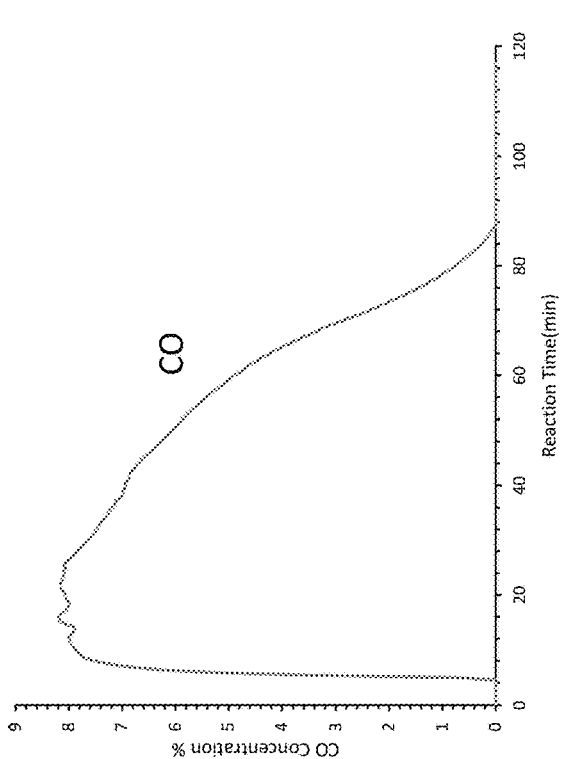
FIGS. 12A and 12B are plots depicting concentrations CO and $H_2$ when $CO_2$ and varied amounts of steam were introduced to a reactor containing Cu—Fe—Al—$O_p$ catalyst and lignite coal at 800° C., with FIG. 12A showing data for a test using 10% steam and 10% $CO_2$, and FIG. 12B showing data for a test using 22% steam and 10% $CO_2$, in accordance with the features of the present invention.
Figure 12B:
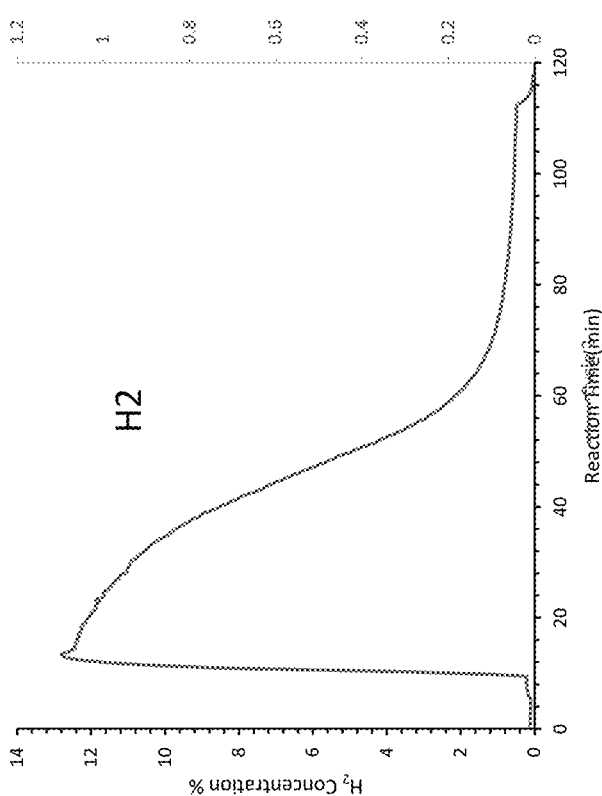
Figure 12B:
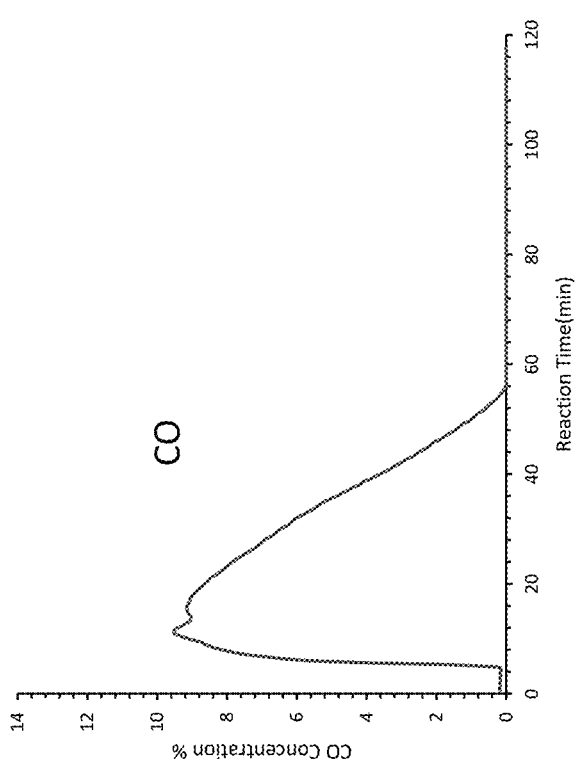

The $CO_2$ containing gas streams from various fuel processes also contain steam. In order to investigate how steam affects the $CO_2$ conversion, tests were conducted at 800° C. with 200 g Cu—Fe—Al—$O_p$ catalyst (100-300µ)/50 g Mississippi Coal and steam/$CO_2$ mixtures according to the Fluidized Bed Flow Reactor Test Procedure outlined above. In these tests, instead of dry $CO_2$, once at temperature, the reactor was provided with 10% $CO_2$/10% steam in helium in one test and 10% $CO_2$/22% steam in helium in another. The CO and $H_2$ concentrations in the effluent gas stream with 10% $CO_2$/10% steam and 10% $CO_2$/22% steam are shown in FIGS. 12A-B. The results indicate that when steam is present with $CO_2$ in the inlet gas stream the product gas was $H_2$ and CO. Thus, the catalyst produces syngas which is a useful chemical precursor when steam is present with $CO_2$.

Figure 13:
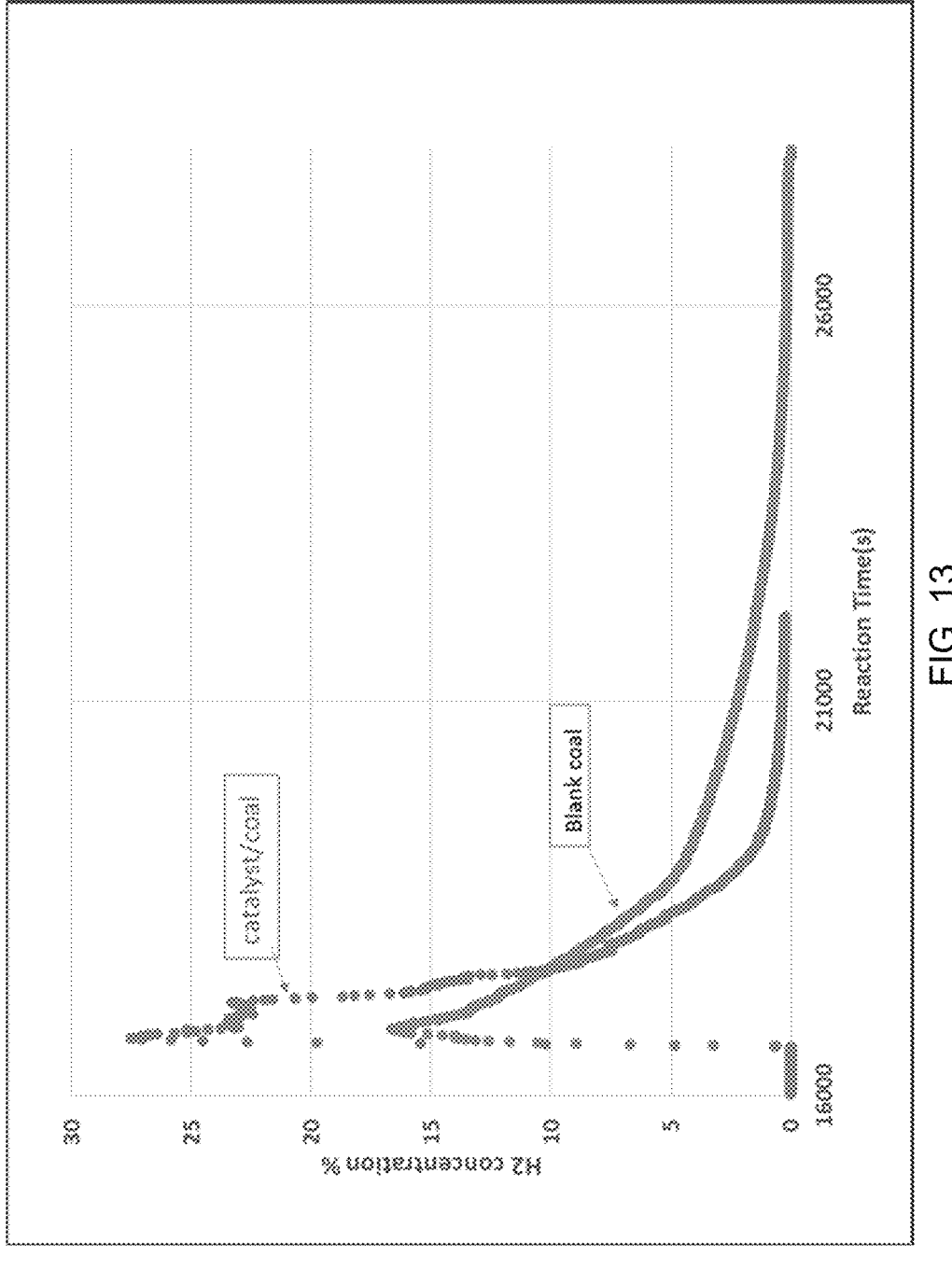
FIG. 13 is a plot depicting concentration of $H_2$ during introduction of 30% steam to a fluidized bed reactor containing Cu—Fe—Al—$O_p$ catalyst and lignite coal at 850° C., in accordance with the features of the present invention.
Figure 14A:
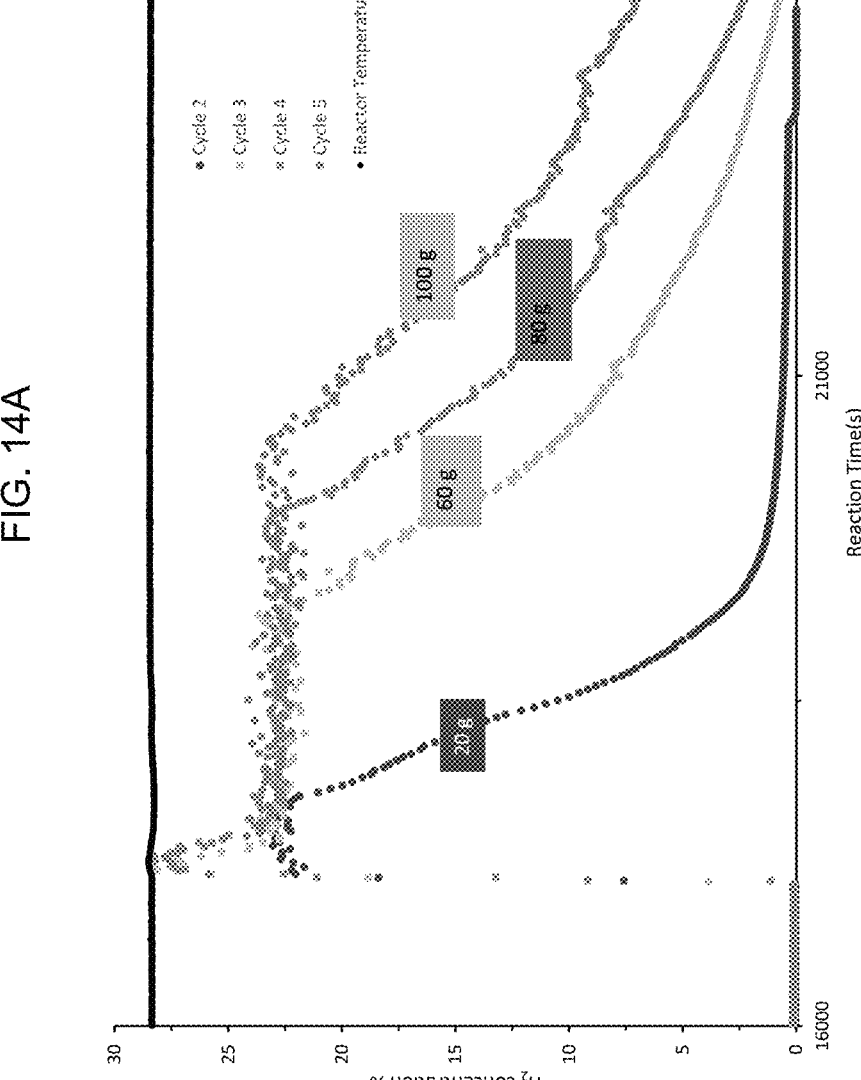
FIGS. 14A-C are plots depicting concentrations of $H_2$, $CO_2$ and CO when 30% steam was introduced to a fluidized bed reactor containing Cu—Fe—Al—$O_p$ catalyst and various amounts of lignite coal at 850° C., with FIG. 14A showing $H_2$ concentration, FIG. 14B showing $CO_2$ concentration, and FIG. 14C showing CO concentration, in accordance with the features of the present invention.
Figure 14B:
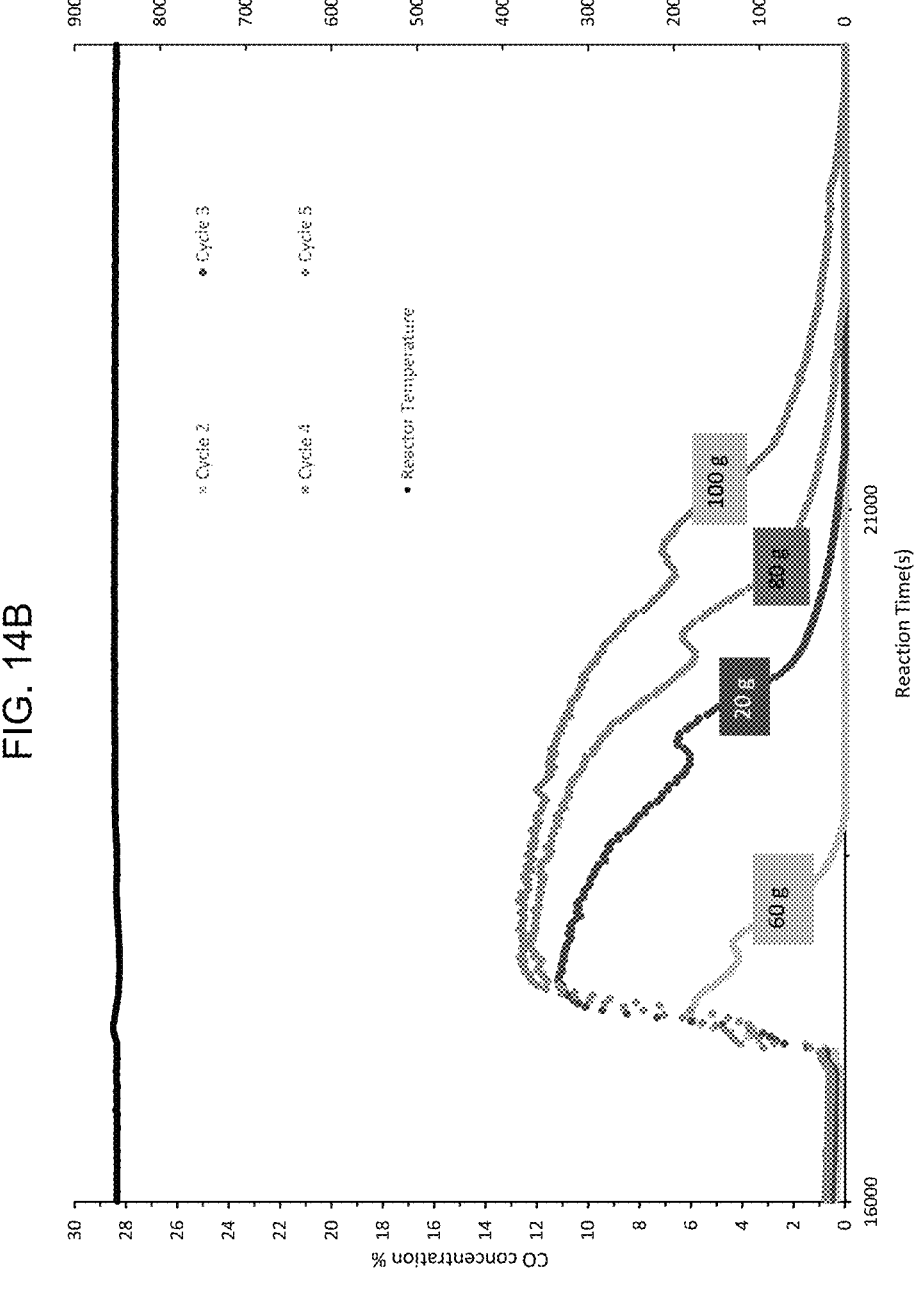
Figure 14C:
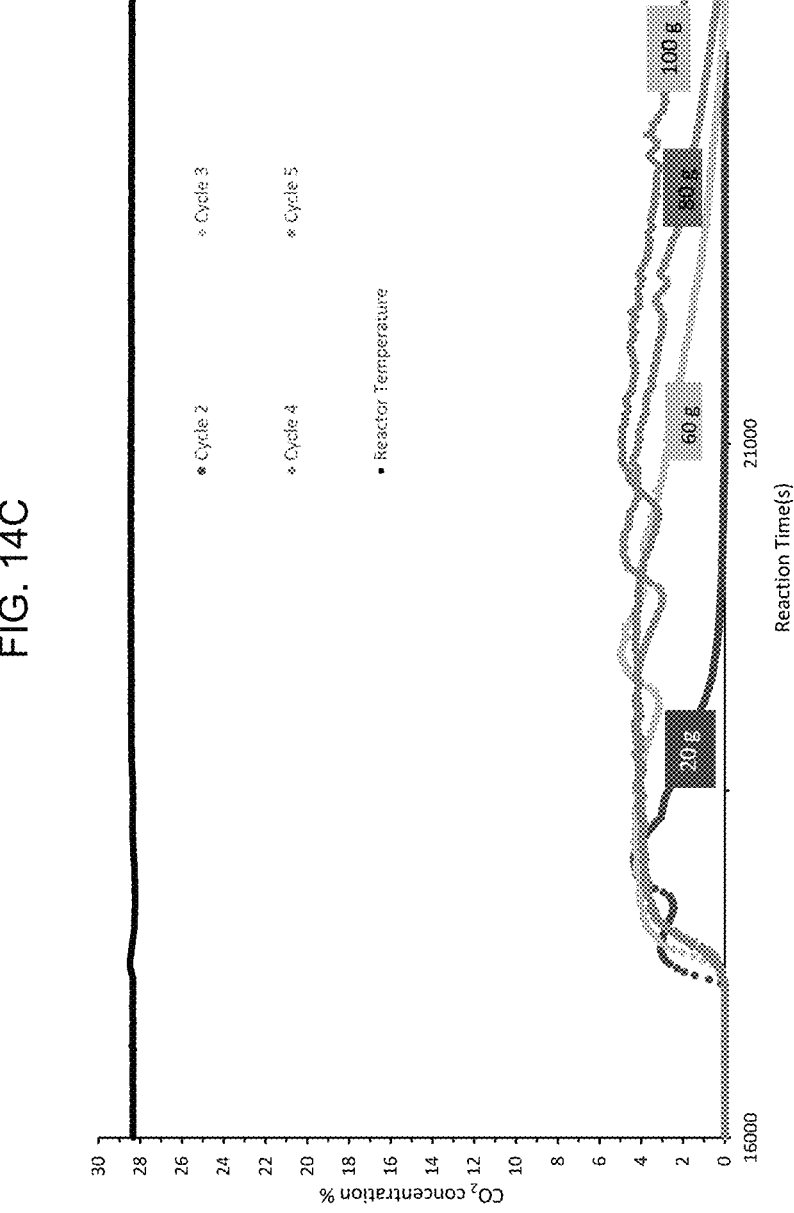

Fluidized Bed Test Data with Coal and Steam:

Fluidized bed data with 30% steam in helium at 850° C. with 325 g Cu—Fe—Al—$O_p$ catalyst 20 having a particle diameter of 100-300µ with 50 g lignite coal are shown in FIG. 13. As shown in FIG. 13, the data show higher $H_2$ production rates with Mississippi lignite coal/steam/catalyst than that with coal/steam. The data indicate that the Cu—Fe—Al—$O_p$ catalyst has high catalytic activity for coal/steam reaction to produce $H_2$ rich syngas. In order to understand the reaction profile, various lignite coal amounts, 20 g, 60 g, 80 g and 100 g and 30% steam were introduced to the Cu—Fe—Al—$O_p$ catalyst at 850° C. The concentrations of $H_2$, CO and $CO_2$ for the reaction of steam with various amounts of coal in the presence of the invented catalyst are shown FIGS. 14A-C. As shown in those figures, $H_2$ rich syngas production continued for a longer period with increasing amounts of coal which indicated that a continuous production of $H_2$ rich syngas can be obtained if coal addition is continued.

Figure 15:
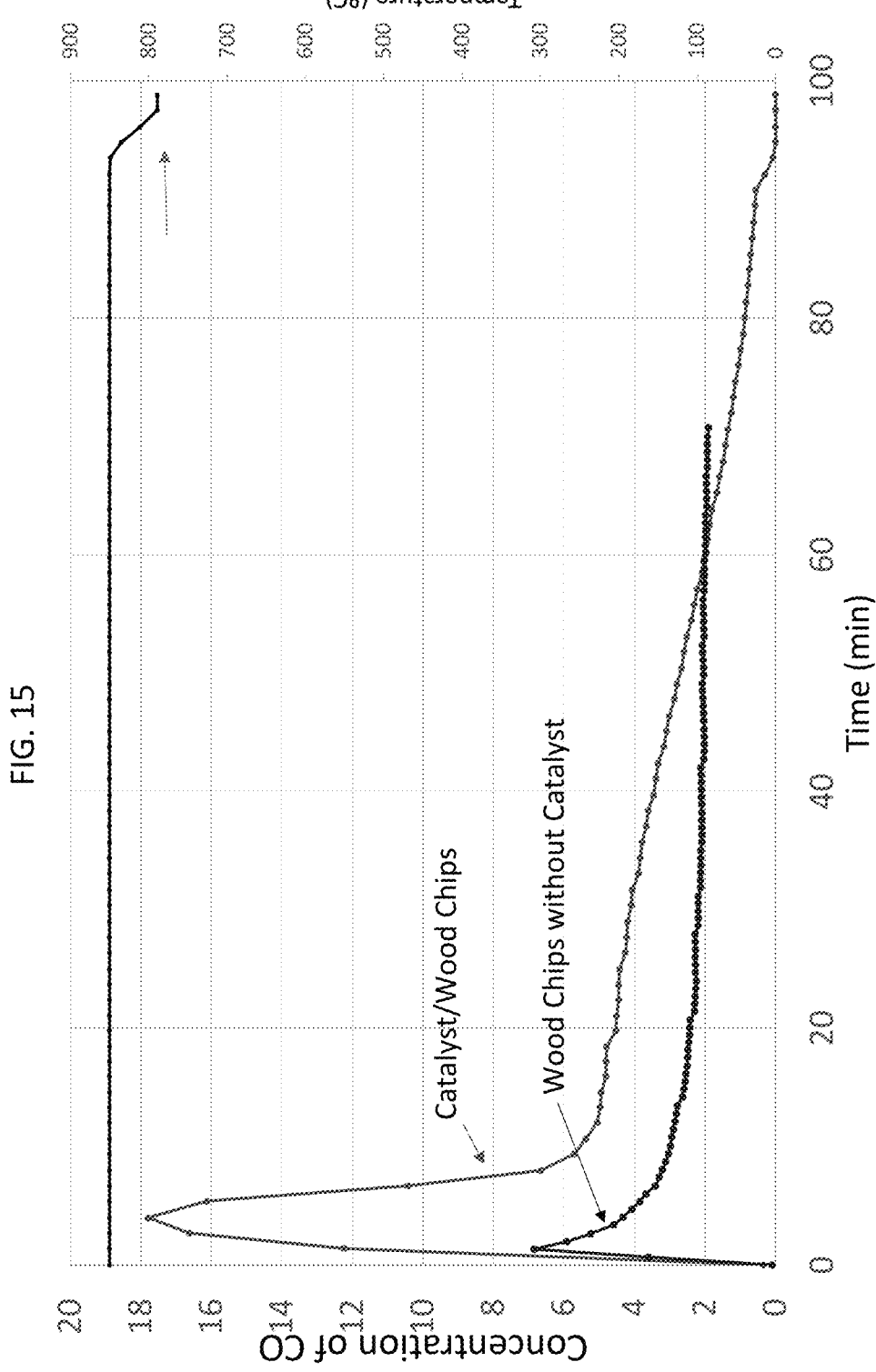
FIG. 15 depicts plots of CO concentration during $CO_2$ introduction to a reactor containing Cu—Fe—Al—$O_p$ catalyst and biomass at 850° C. and CO concentration during introduction of $CO_2$ to a reactor containing biomass and no catalyst at 850° C., in accordance with the features of the present invention.

Fixed Bed Test Data with Biomass and Steam:

Data on the concentration of CO in effluent gas when 20% $CO_2$ in He was introduced to wood pellets (1 g) and Cu—Fe—Al—$O_p$ catalyst (7 g) at 850° C. is shown in FIG. 15, with the baseline test with the data for the baseline woodchips without catalyst shown in FIG. 15. The data indicated that the CO production rate was significantly higher with wood pellets/catalyst than that with the base line data with wood pellets without the catalyst.

Figure 16A:
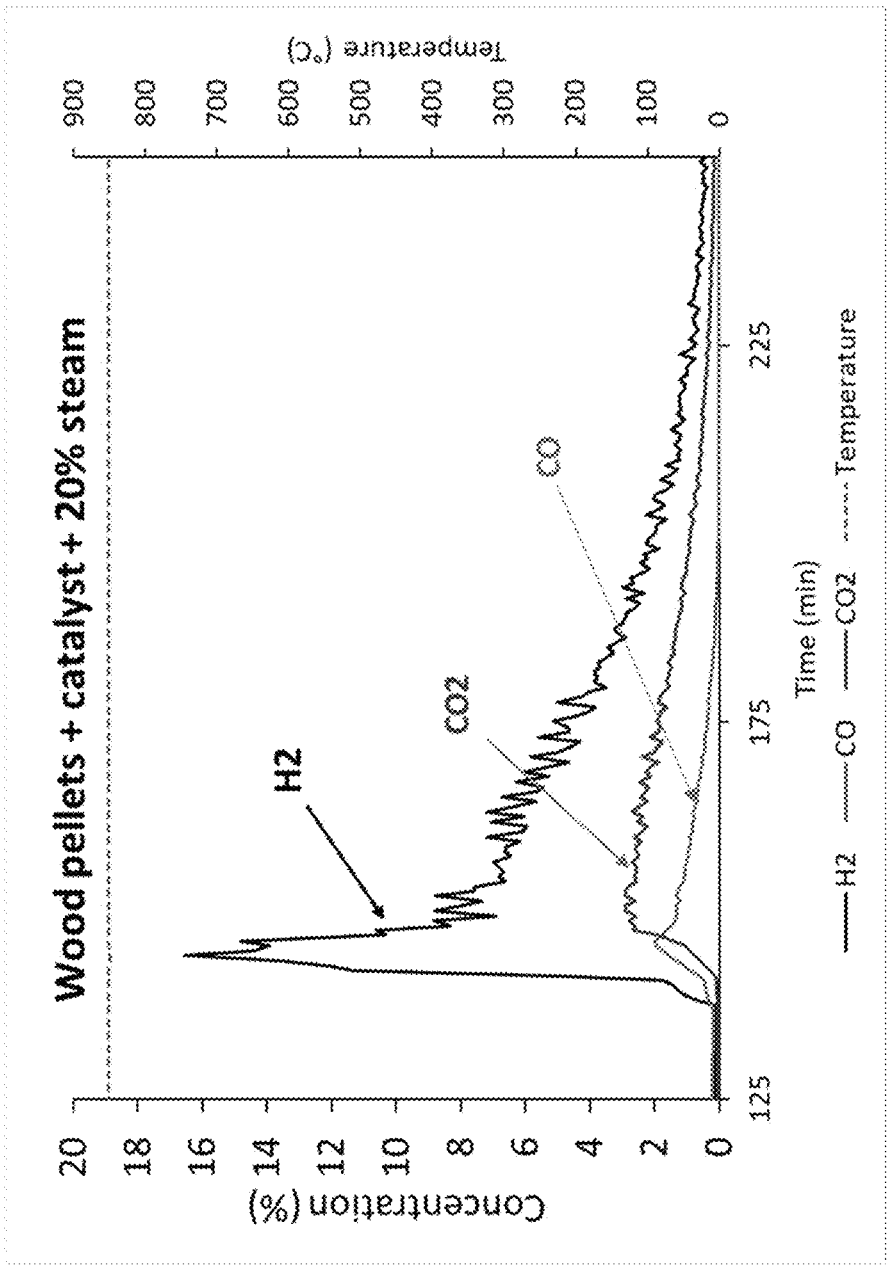
FIGS. 16A-B are plots depicting $H_2$, CO and $CO_2$ concentrations during introduction of steam to a reactor with FIG. 16A showing $H_2$, CO and $CO_2$ concentrations during introduction of steam to a reactor containing Cu—Fe—Al—$O_p$ catalyst and biomass at 850° C.
Figure 16B:
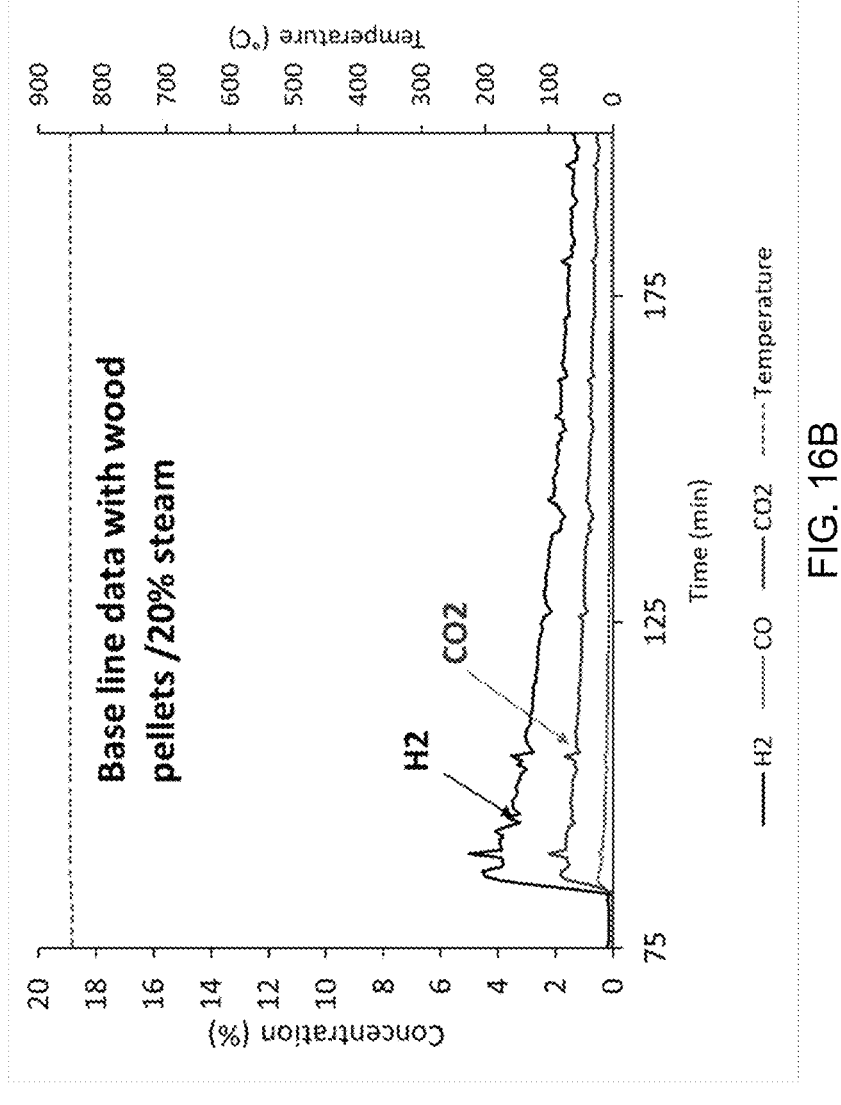

Data on the concentrations of $H_2$, CO and $CO_2$ when 20% steam in He was introduced to wood pellets (1 g) and Cu—Fe—Al—$O_p$ catalyst (6.3 g) at 850° C. is shown in FIG. 16A, with the baseline test with the data for the baseline woodchips without catalyst shown in FIG. 16B. The data indicate that the $H_2$ production rate was significantly higher with wood pellets/catalyst than that with the base line data with wood pellets without the catalyst.

X-Ray Diffraction Data

X-ray diffraction studies (XRD) were conducted to identify the structure of pre-catalyst 42 CuO—$Fe_2O_3$-Alumina prior to reduction, after reduction to form the Cu—Fe—Al—$O_p$ catalyst and after five lignite coal additions for the reaction with coal/$CO_2$ at 800° C. Crystalline phase prior to reduction was identified by XRD as $CuFeAlO_4$. The XRD data of fresh catalyst (fully reduced with $H_2$) indicated the presence of $Fe^0$, $Cu^0$ and $Al_2O_3$. The reacted sample contained $Fe^0$, $Cu^0$, alumina, and $FeAl_2O_4$. The data indicated that metallic iron, copper and $FeAl_2O_4$ remained after multicycle reaction with coal/$CO_2$.

Fixed Bed Test Data with $CH_4$, $CO_2$ and Cu—Fe—Al—$O_p$ Catalyst

A test was performed to demonstrate the embodiment the invention using $CH_4$ as the fuel. These tests utilize a (inner diameter 7 mm) Autoclave Engineers BTR atmospheric flow reactor at 14.7 psi ($1.01 \times 10^5$ Pa) with a Pfeiffer Vacuum Omnistar mass spectrometer used to test outlet gas compositions. Bench-scale fixed-bed flow reactor (inner diameter 7 mm) tests were conducted with a 9 g of reduced Cu—Fe—Al—$O_p$ catalyst. Then 8-9% $CH_4$ in helium and 8-9% $CO_2$ in helium were introduced at 800° C. The total flow rate was 200 cm³/min (0.2 L/min).

Figure 17:
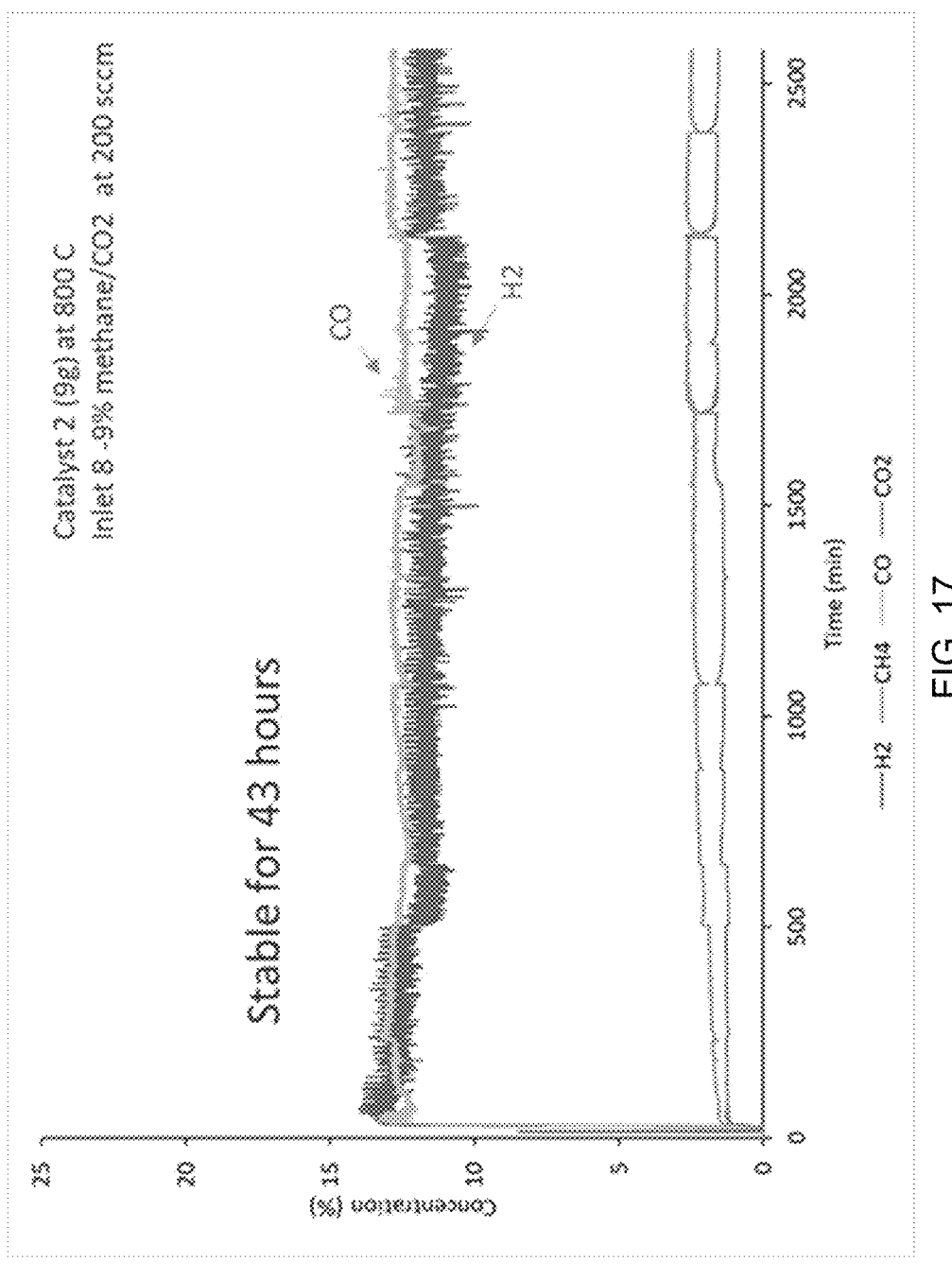
FIG. 17 is a plot depicting CO and $H_2$ concentrations during the introduction of 8% $CH_4$ and 8% $CO_2$ to a reactor containing Cu—Fe—Al—$O_p$ catalyst at 800° C., in accordance with the features of the present invention.

When methane and $CO_2$ were introduced to reduced Cu—Fe—Al—$O_p$ alumina catalyst at 800° C. the effluent gas composition data shown in FIG. 17 indicated production of CO and $H_2$. The reaction appears to proceed via reaction R7 to form $H_2$ and CO. Methane and $CO_2$ concentrations remained very low indicating high conversion of methane and $CO_2$. A very stable performance was observed for 43 hours as shown in FIG. 17. Methane conversion to syngas was approximately about 80% for the duration of the 43 hour test.

One or more embodiments include the syngas product stream is at least >25% vol. of $H_2$ and CO when methane and $CO_2$ are used in the catalytic process. The reactor may comprise a fluidized bed, fixed bed, moving bed or spout bed. The reaction temperature of the reduced metal, coal and steam is greater than 500° C.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible subranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A catalytic method for producing gaseous products from a fuel and a gaseous reagent comprising:

providing a catalyst and the fuel to a reactor vessel such that the catalyst and the fuel are in fluid communication with each other within the reactor vessel, wherein the catalyst comprises reduced metal aluminate compounds, wherein the reduced metal aluminate compounds are selected from the group consisting of $Cu_x$—$Al_m$—$O_p$, $Fe_y$—$Al_m$—$O_p$, $Fe_y$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, and combinations thereof, wherein $5 \geq x > 0$, $5 \geq y > 0$, $5 \geq z > 0$, $5 \geq m > 0$, and $4 \geq p > 0$; and contacting the fuel and catalyst with the gaseous reagent supplied from an external source within the reactor vessel at a reaction temperature to produce gaseous products, wherein the gaseous reagent comprises $CO_2$, wherein the fuel comprises a carbonaceous source, and wherein the gaseous products comprise CO.

2. The method of claim 1 wherein the carbonaceous source is selected from the group consisting of coal, biomass, biooil, coke, biochar, methane, plastics and combinations thereof.

3. The method of claim 1 wherein the gaseous reagent further comprises $H_2O$, and wherein the gaseous products further comprise $H_2$.

4. The method of claim 1 wherein the catalyst and fuel are provided separately.

5. The method of claim 1 wherein the carbonaceous source is a solid selected from the group consisting of coal, biochar, coke, biomass, plastics and combinations thereof, wherein the gaseous reagent is a combination of $CO_2$ and $H_2O$, and wherein the gaseous products comprise a stream of CO and $H_2$ free from nitrogen.

6. The method of claim 1 wherein the fuel comprises $CH_4$, wherein the gaseous reagent comprises $CO_2$, and wherein the gaseous products comprise a stream of $H_2$ and CO free from nitrogen.

7. The method of claim 1 wherein the catalyst and fuel are not mixed or chemically intermingled prior to being provided to the reactor vessel.

8. The method of claim 1 wherein the reduced metal aluminate compounds are selected from the group consisting of Cu—Fe—Mn—Al—$O_p$, Cu—$Fe_2$—Al—$O_p$, Cu—$Fe_{1.5}$—Al—$O_p$, $Fe_{2.5}$—$Al_{0.5}$—$O_p$, Cu—Al—$O_p$, and combinations thereof, where $4 \geq p > 0$.

9. The method of claim 1 wherein the fuel and gaseous reagent are provided to the reactor vessel continuously.

10. A catalytic method for producing syngas products from a carbonaceous source and gaseous reagent comprising:

providing the carbonaceous source and a catalyst to a reactor vessel, wherein the catalyst comprises reduced metal aluminate compounds selected from the group consisting of $Cu_x$—$Al_m$—$O_p$, $Fe_y$—$Al_m$—$O_p$, $Fe_y$—$Mn_z$—$Al_m$—$O_p$, $Cu_x$—$Fe_y$—$Al_m$—$O_p$, $Cu_x$—$Mn_z$—$Al_m$—$O_p$, $Cu_x$—$Fe_y$—$Mn_z$—$Al_m$—$O_p$, and combinations thereof, wherein $5 \geq x > 0$, $5 \geq y > 0$, $5 \geq z > 0$, $5 \geq m > 0$, and $4 \geq p > 0$; and contacting the carbonaceous source and catalyst with a gaseous reagent to generate gaseous products where the gaseous reagent comprises $CO_2$ supplied from an external source and a gaseous product that comprises a product stream of at least 25% by volume CO.

11. The method of claim 10 wherein the gaseous reagent comprises $CO_2$ and $H_2O$, and wherein the gaseous products comprise CO and $H_2$.

12. The method of claim 10 wherein the gaseous reagent comprises $H_2O$, and wherein the gaseous products comprise CO and $H_2$.

13. The method of claim 10 wherein the reduced metal aluminate compounds are selected from the group consisting of Cu—Fe—Mn—Al—$O_p$, Cu—$Fe_2$—Al—$O_p$, Cu—$Fe_{1.5}$—Al—$O_p$, $Fe_{2.5}$—$Al_{0.5}$—$O_p$, Cu—Al—$O_p$, and combinations thereof, where $4 \geq p > 0$.

14. The method of claim 10 wherein the carbonaceous source and catalyst are not chemically intermingled prior to being introduced to the reactor vessel.

15. The method of claim 10 wherein the carbonaceous source comprises $CH_4$, wherein the gaseous reagent comprises $CO_2$, and wherein the gaseous product comprises CO and $H_2$.

16. The method of claim 10 wherein the carbonaceous source is a solid selected from the group consisting of coal, biochar, coke, biomass, plastics and combinations thereof, wherein the gaseous reagent is $CO_2$, and wherein the gaseous product comprises a stream of CO free from nitrogen.

17. The method of claim 10 wherein the carbonaceous source is a solid selected from the group consisting of coal, biochar, coke, biomass, plastics and combinations thereof, wherein the gaseous reagent is a combination of $CO_2$ and $H_2O$, and wherein the gaseous product comprises a stream of CO and $H_2$ free from nitrogen.

18. The method of claim 1 wherein the catalyst is calcined above about 1000° C.

19. The method of claim 10 wherein the catalyst is calcined above about 1000° C.

* * * * *